(12) United States Patent
Brykalski et al.

(10) Patent No.: US 9,989,267 B2
(45) Date of Patent: Jun. 5, 2018

(54) MOISTURE ABATEMENT IN HEATING OPERATION OF CLIMATE CONTROLLED SYSTEMS

(71) Applicant: Gentherm Incorporated, Northville, MI (US)

(72) Inventors: Michael Brykalski, South Lyon, MI (US); David Marquette, Farmington Hills, MI (US)

(73) Assignee: GENTHERM INCORPORATED, Northville, MI (US)

( * ) Notice: Subject to any disclaimer, the term of this patent is extended or adjusted under 35 U.S.C. 154(b) by 1102 days.

(21) Appl. No.: 13/763,563

(22) Filed: Feb. 8, 2013

(65) Prior Publication Data

US 2013/0206852 A1    Aug. 15, 2013

Related U.S. Application Data

(60) Provisional application No. 61/597,568, filed on Feb. 10, 2012.

(51) Int. Cl.
    *F24D 19/10*      (2006.01)
    *F24H 9/20*      (2006.01)
    (Continued)

(52) U.S. Cl.
    CPC ..... *F24D 19/1096* (2013.01); *B60H 1/00478* (2013.01); *B60H 1/3233* (2013.01);
    (Continued)

(58) Field of Classification Search
    CPC ............ F24D 19/1096; B60H 1/00478; B60H 1/3233; B60N 2/5692; F24F 5/0042; H05B 1/0238
    See application file for complete search history.

(56) References Cited

U.S. PATENT DOCUMENTS 1,839,156 A    12/1931   Lumpkin
2,235,620 A    3/1941   Nessell
(Continued)

FOREIGN PATENT DOCUMENTS

CA      979490      12/1975
CN     101 219 025     7/2008
(Continued)

OTHER PUBLICATIONS

Seo, KR 10-2005-0011494 A English machine translation, Jan. 29, 2005.*

(Continued)

*Primary Examiner* — Alissa Tompkins
*Assistant Examiner* — Phillip E Decker
(74) *Attorney, Agent, or Firm* — Knobbe, Martens, Olson & Bear, LLP

(57) ABSTRACT

Embodiments related to moisture abatement during a heating operation of a climate control system are disclosed. In some embodiments, the climate control system includes a thermoelectric device (TED) or other thermal condition device having a hot side and a cold side. In certain embodiments, the thermal conditioning device is operated (e.g., by a processor or a condensate switch) to inhibit or prevent the occurrence of condensation, and/or to abate condensation that has already occurred, on the cold side of the thermal conditioning device during the heating operation.

25 Claims, 11 Drawing Sheets

(51) Int. Cl.
*F24F 5/00* (2006.01)
*H05B 1/02* (2006.01)
*B60H 1/00* (2006.01)
*B60H 1/32* (2006.01)
*B60N 2/56* (2006.01)
*F24H 3/04* (2006.01)

(52) U.S. Cl.
CPC ......... *B60N 2/5635* (2013.01); *B60N 2/5657* (2013.01); *B60N 2/5692* (2013.01); *F24F 5/0042* (2013.01); *F24H 9/2064* (2013.01); *H05B 1/0238* (2013.01); *H05B 1/0283* (2013.01); *F24F 2221/10* (2013.01); *F24H 3/0429* (2013.01)

(56) References Cited

U.S. PATENT DOCUMENTS

| | | |
|---|---|---|
| 2,362,259 A | 11/1944 | Findley |
| 2,363,168 A | 11/1944 | Findley |
| 2,461,432 A | 2/1949 | Mitchell |
| 2,462,984 A | 3/1949 | Maddison |
| 2,493,067 A | 1/1950 | Goldsmith |
| 2,512,559 A | 6/1950 | Williams |
| 2,519,241 A | 8/1950 | Findley |
| 2,782,834 A | 2/1957 | Vigo |
| 2,791,956 A | 5/1957 | Guest |
| 2,813,708 A | 11/1957 | Frey |
| 2,884,956 A | 5/1959 | Perlin |
| 2,931,286 A | 4/1960 | Fry, Sr. et al. |
| 2,959,017 A | 11/1960 | Gilman et al. |
| 2,976,700 A | 3/1961 | Jackson |
| 2,984,077 A | 5/1961 | Gaskill |
| 3,019,609 A | 2/1962 | Pietsch |
| 3,030,145 A | 4/1962 | Kottemann |
| 3,039,817 A | 6/1962 | Taylor |
| 3,077,079 A | 2/1963 | Pietsch |
| 3,085,405 A | 4/1963 | Frantti |
| 3,090,206 A | 5/1963 | Anders |
| 3,136,577 A | 6/1964 | Richard |
| 3,137,142 A | 6/1964 | Venema |
| 3,137,523 A | 6/1964 | Karner |
| 3,138,934 A | 6/1964 | Roane |
| 3,178,894 A | 4/1965 | Mole et al. |
| 3,186,240 A | 6/1965 | Daubert |
| 3,197,342 A | 7/1965 | Neild |
| 3,212,275 A | 10/1965 | Tillman |
| 3,240,628 A | 3/1966 | Sonntag, Jr. |
| 3,253,649 A | 5/1966 | Laing |
| 3,266,064 A | 8/1966 | Figman |
| 3,282,267 A | 11/1966 | Eidus |
| 3,298,195 A | 1/1967 | Raskhodoff |
| 3,300,649 A | 1/1967 | Strawn |
| 3,325,312 A | 6/1967 | Sonntag, Jr. |
| 3,326,727 A | 6/1967 | Fritts |
| 3,351,498 A | 11/1967 | Shinn et al. |
| 3,366,164 A | 1/1968 | Newton |
| 3,392,535 A | 7/1968 | De Castelet |
| 3,486,177 A | 12/1969 | Marshack |
| 3,529,310 A | 9/1970 | Olmo |
| 3,550,523 A | 12/1970 | Segal |
| 3,599,437 A | 8/1971 | Panas |
| 3,615,870 A | 10/1971 | Crouthamel |
| 3,627,299 A | 12/1971 | Schwartze et al. |
| 3,632,451 A | 1/1972 | Abbott |
| 3,640,456 A | 2/1972 | Sturgis |
| 3,648,469 A | 3/1972 | Chapman |
| 3,703,141 A | 11/1972 | Pernoud |
| 3,767,470 A | 10/1973 | Hines |
| 3,786,230 A | 1/1974 | Brandenburg, Jr. |
| 3,819,418 A | 6/1974 | Winkler et al. |
| 3,839,876 A | 10/1974 | Privas |
| 3,870,568 A | 3/1975 | Oesterhelt et al. |
| 3,876,860 A | 4/1975 | Nomura et al. |
| 3,894,213 A | 7/1975 | Agarwala |
| 3,899,054 A | 8/1975 | Huntress et al. |
| 3,902,923 A | 9/1975 | Evans et al. |
| 3,916,151 A | 10/1975 | Reix |
| 3,926,052 A * | 12/1975 | Bechtel ............... G01N 25/68 374/20 |
| 3,927,299 A | 12/1975 | Sturgis |
| 3,928,876 A | 12/1975 | Starr |
| 4,002,108 A | 1/1977 | Drori |
| 4,044,824 A | 8/1977 | Eskeli |
| 4,124,794 A | 11/1978 | Eder |
| 4,195,687 A | 4/1980 | Taziker |
| 4,223,205 A | 9/1980 | Sturgis |
| 4,224,565 A * | 9/1980 | Sosniak ............... G01N 25/68 324/687 |
| 4,281,516 A | 8/1981 | Berthet et al. |
| 4,315,599 A | 2/1982 | Biancardi |
| 4,336,444 A | 6/1982 | Bice et al. |
| 4,338,944 A | 7/1982 | Arkans |
| 4,391,009 A | 7/1983 | Schild et al. |
| 4,413,857 A | 11/1983 | Hayashi |
| 4,423,308 A | 12/1983 | Callaway et al. |
| 4,437,702 A | 3/1984 | Agosta |
| 4,438,070 A | 3/1984 | Stephens et al. |
| 4,459,428 A | 7/1984 | Chou |
| 4,491,173 A | 1/1985 | Demand |
| 4,493,939 A | 1/1985 | Blaske et al. |
| 4,497,973 A | 2/1985 | Heath et al. |
| 4,506,510 A | 3/1985 | Tircot |
| 4,518,700 A | 5/1985 | Stephens |
| 4,518,847 A | 5/1985 | Horst, Sr. et al. |
| 4,549,134 A | 10/1985 | Weiss |
| 4,554,968 A | 11/1985 | Haas |
| 4,567,351 A | 1/1986 | Kitagawa et al. |
| 4,572,430 A | 2/1986 | Takagi et al. |
| 4,639,883 A | 1/1987 | Michaelis |
| 4,665,707 A | 5/1987 | Hamilton |
| 4,671,567 A | 6/1987 | Frobose |
| 4,677,416 A * | 6/1987 | Nishimoto ............... H01L 35/08 136/203 |
| 4,685,727 A | 8/1987 | Cremer et al. |
| 4,688,390 A | 8/1987 | Sawyer |
| 4,704,320 A | 11/1987 | Mizunoya et al. |
| 4,711,294 A | 12/1987 | Jacobs et al. |
| 4,712,832 A | 12/1987 | Antolini et al. |
| 4,777,802 A | 10/1988 | Feher |
| 4,782,664 A | 11/1988 | Sterna et al. |
| 4,791,274 A | 12/1988 | Horst |
| 4,793,651 A | 12/1988 | Inagaki et al. |
| 4,802,929 A | 2/1989 | Schock |
| 4,812,733 A | 3/1989 | Tobey |
| 4,823,554 A | 4/1989 | Trachtenberg et al. |
| 4,825,488 A | 5/1989 | Bedford |
| 4,828,627 A | 5/1989 | Connery |
| 4,853,992 A | 8/1989 | Yu |
| 4,923,248 A | 5/1990 | Feher |
| 4,947,648 A | 8/1990 | Harwell et al. |
| 4,969,684 A | 11/1990 | Zarotti |
| 4,981,324 A | 1/1991 | Law |
| 4,988,847 A | 1/1991 | Argos et al. |
| 4,997,230 A | 3/1991 | Spitalnick |
| 5,002,336 A | 3/1991 | Feher |
| 5,012,325 A | 4/1991 | Mansuria et al. |
| 5,014,909 A | 5/1991 | Yasuo |
| 5,016,304 A | 5/1991 | Ryhiner |
| 5,022,462 A | 6/1991 | Flint et al. |
| 5,057,490 A | 10/1991 | Skertic |
| 5,070,937 A | 12/1991 | Mougin et al. |
| 5,077,709 A | 12/1991 | Feher |
| 5,088,790 A | 2/1992 | Wainwright et al. |
| 5,102,189 A | 4/1992 | Saito et al. |
| 5,106,161 A | 4/1992 | Meiller |
| 5,111,025 A | 5/1992 | Barma et al. |
| 5,111,664 A | 5/1992 | Yang |
| 5,117,638 A | 6/1992 | Feher |
| 5,119,640 A | 6/1992 | Conrad |
| 5,125,238 A | 6/1992 | Ragan et al. |
| 5,148,977 A | 9/1992 | Hibino et al. |
| 5,166,777 A | 11/1992 | Kataoka |
| 5,187,349 A | 2/1993 | Curhan et al. |

(56) References Cited

U.S. PATENT DOCUMENTS

| | | | |
|---|---|---|---|
| 5,188,286 A | 2/1993 | Pence, IV | |
| 5,255,735 A | 10/1993 | Raghava et al. | |
| 5,256,857 A | 10/1993 | Curhan et al. | |
| 5,265,599 A | 11/1993 | Stephenson et al. | |
| 5,278,936 A | 1/1994 | Shao | |
| 5,279,128 A | 1/1994 | Tomatsu et al. | |
| 5,335,381 A | 8/1994 | Chang | |
| 5,367,728 A | 11/1994 | Chang | |
| 5,372,402 A | 12/1994 | Kuo | |
| 5,375,421 A | 12/1994 | Hsieh | |
| 5,382,075 A | 1/1995 | Shih | |
| 5,385,382 A | 1/1995 | Single, II et al. | |
| 5,409,547 A | 4/1995 | Watanabe et al. | |
| 5,413,166 A | 5/1995 | Single, II et al. | |
| 5,416,935 A | 5/1995 | Nieh | |
| 5,419,489 A | 5/1995 | Burd | |
| 5,419,780 A | 5/1995 | Suski | |
| 5,430,322 A | 7/1995 | Koyanagi et al. | |
| 5,448,788 A | 9/1995 | Wu | |
| 5,448,891 A | 9/1995 | Nakagiri et al. | |
| 5,456,081 A | 10/1995 | Chrysler et al. | |
| 5,473,783 A | 12/1995 | Allen | |
| 5,493,742 A | 2/1996 | Klearman | |
| 5,493,864 A | 2/1996 | Pomerence et al. | |
| 5,505,520 A | 4/1996 | Frusti et al. | |
| 5,515,238 A | 5/1996 | Fritz et al. | |
| 5,524,439 A | 6/1996 | Gallup et al. | |
| 5,542,503 A | 8/1996 | Dunn et al. | |
| 5,544,487 A | 8/1996 | Attey et al. | |
| 5,544,488 A | 8/1996 | Reid | |
| 5,555,732 A | 9/1996 | Whiticar | |
| 5,561,981 A | 10/1996 | Quisenberry et al. | |
| 5,576,512 A | 11/1996 | Doke | |
| 5,584,084 A | 12/1996 | Klearman et al. | |
| 5,584,183 A | 12/1996 | Wright et al. | |
| 5,597,200 A | 1/1997 | Gregory et al. | |
| 5,601,399 A | 2/1997 | Okpara et al. | |
| 5,606,639 A | 2/1997 | Lehoe et al. | |
| 5,613,729 A | 3/1997 | Summer, Jr. | |
| 5,613,730 A | 3/1997 | Buie et al. | |
| 5,623,828 A | 4/1997 | Harrington | |
| 5,626,021 A * | 5/1997 | Karunasiri | B60H 1/00478 236/49.3 |
| 5,626,386 A | 5/1997 | Lush | |
| 5,634,342 A | 6/1997 | Peeters et al. | |
| 5,637,921 A | 6/1997 | Burward-Hoy | |
| 5,640,728 A | 6/1997 | Graebe | |
| 5,642,539 A | 7/1997 | Kuo | |
| 5,645,314 A | 7/1997 | Liou | |
| 5,650,904 A | 7/1997 | Gilley et al. | |
| 5,653,741 A | 8/1997 | Grant | |
| 5,667,622 A | 9/1997 | Hasegawa et al. | |
| 5,675,852 A | 10/1997 | Watkins | |
| 5,690,849 A | 11/1997 | DeVilbiss et al. | |
| 5,692,952 A | 12/1997 | Chih-Hung | |
| 5,704,213 A | 1/1998 | Smith et al. | |
| 5,715,695 A | 2/1998 | Lord | |
| 5,721,804 A | 2/1998 | Greene, III | |
| 5,724,818 A | 3/1998 | Iwata et al. | |
| 5,729,981 A | 3/1998 | Markus et al. | |
| 5,761,908 A | 6/1998 | Oas et al. | |
| 5,761,909 A | 6/1998 | Hughes et al. | |
| 5,798,583 A | 8/1998 | Morita | |
| 5,802,855 A | 9/1998 | Yamaguchi et al. | |
| 5,802,856 A | 9/1998 | Schaper et al. | |
| 5,822,993 A | 10/1998 | Attey | |
| 5,827,424 A | 10/1998 | Gillis et al. | |
| 5,833,321 A | 11/1998 | Kim et al. | |
| 5,850,741 A | 12/1998 | Feher | |
| 5,865,031 A | 2/1999 | Itakura | |
| 5,871,151 A | 2/1999 | Fiedrich | |
| 5,884,485 A | 3/1999 | Yamaguchi et al. | |
| 5,884,486 A | 3/1999 | Hughes et al. | |
| 5,887,304 A | 3/1999 | Von der Heyde | |
| 5,888,261 A | 3/1999 | Fortune | |
| 5,895,964 A | 4/1999 | Nakayama | |
| 5,902,014 A | 5/1999 | Dinkel et al. | |
| 5,921,100 A | 7/1999 | Yoshinori et al. | |
| 5,921,314 A | 7/1999 | Schuller et al. | |
| 5,921,858 A | 7/1999 | Kawai et al. | |
| 5,924,289 A | 7/1999 | Bishop, II | |
| 5,924,766 A | 7/1999 | Esaki et al. | |
| 5,924,767 A | 7/1999 | Pietryga | |
| 5,927,817 A | 7/1999 | Ekman et al. | |
| 5,934,748 A | 8/1999 | Faust et al. | |
| 5,936,192 A | 8/1999 | Tauchi | |
| 5,937,908 A | 8/1999 | Inoshiri et al. | |
| 5,948,303 A | 9/1999 | Larson | |
| 5,950,067 A | 9/1999 | Maegawa et al. | |
| 5,952,728 A | 9/1999 | Imanishi et al. | |
| 5,987,893 A | 11/1999 | Schultz-Harder et al. | |
| 5,988,568 A | 11/1999 | Drews | |
| 5,992,154 A | 11/1999 | Kawada et al. | |
| 5,994,637 A | 11/1999 | Imanushi et al. | |
| 5,995,711 A | 11/1999 | Fukuoka et al. | |
| 6,000,225 A | 12/1999 | Ghoshal | |
| 6,003,950 A | 12/1999 | Larsson | |
| 6,006,524 A | 12/1999 | Park | |
| 6,019,420 A | 2/2000 | Faust et al. | |
| 6,038,865 A | 3/2000 | Watanabe et al. | |
| 6,048,024 A | 4/2000 | Wallman | |
| 6,049,655 A | 4/2000 | Vazirani | |
| 6,052,853 A | 4/2000 | Schmid | |
| 6,053,163 A | 4/2000 | Bass | |
| 6,059,018 A | 5/2000 | Yoshinori et al. | |
| 6,062,641 A | 5/2000 | Suzuki et al. | |
| 6,072,924 A | 6/2000 | Sato et al. | |
| 6,072,938 A | 6/2000 | Peterson et al. | |
| 6,073,998 A | 6/2000 | Siarkowski et al. | |
| 6,079,485 A | 6/2000 | Esaki et al. | |
| 6,084,172 A | 7/2000 | Kishi et al. | |
| 6,085,369 A | 7/2000 | Feher | |
| 6,086,831 A | 7/2000 | Harness et al. | |
| 6,087,638 A | 7/2000 | Silverbrook | |
| 6,094,919 A | 8/2000 | Bhatia | |
| 6,097,088 A | 8/2000 | Sakuragi | |
| 6,100,463 A | 8/2000 | Ladd et al. | |
| 6,101,815 A | 8/2000 | Van Oort et al. | |
| 6,105,373 A | 8/2000 | Watanabe et al. | |
| 6,109,688 A | 8/2000 | Wurz et al. | |
| 6,112,525 A | 9/2000 | Yoshida et al. | |
| 6,112,531 A | 9/2000 | Yamaguchi | |
| 6,116,029 A | 9/2000 | Krawec | |
| 6,119,463 A * | 9/2000 | Bell | B60H 1/00478 165/86 |
| 6,120,370 A | 9/2000 | Asou et al. | |
| 6,127,619 A | 10/2000 | Xi et al. | |
| 6,141,969 A | 11/2000 | Launchbury et al. | |
| 6,145,925 A | 11/2000 | Eksin et al. | |
| 6,158,224 A | 12/2000 | Hu et al. | |
| 6,161,241 A | 12/2000 | Zysman | |
| 6,161,388 A | 12/2000 | Ghoshal | |
| 6,164,076 A | 12/2000 | Chu et al. | |
| 6,164,719 A | 12/2000 | Rauh | |
| 6,171,333 B1 | 1/2001 | Nelson et al. | |
| 6,178,292 B1 | 1/2001 | Fukuoka et al. | |
| 6,179,706 B1 | 1/2001 | Yoshinori et al. | |
| 6,186,592 B1 | 2/2001 | Orizakis et al. | |
| 6,189,966 B1 | 2/2001 | Faust et al. | |
| 6,189,967 B1 | 2/2001 | Short | |
| 6,196,627 B1 | 3/2001 | Faust et al. | |
| 6,196,839 B1 | 3/2001 | Ross | |
| 6,206,465 B1 | 3/2001 | Faust et al. | |
| 6,213,198 B1 | 4/2001 | Shikata et al. | |
| 6,222,243 B1 | 4/2001 | Kishi et al. | |
| 6,223,539 B1 | 5/2001 | Bell | |
| 6,233,959 B1 | 5/2001 | Kang et al. | |
| 6,250,083 B1 | 6/2001 | Chou | |
| 6,256,996 B1 | 7/2001 | Ghoshal | |
| 6,262,357 B1 | 7/2001 | Johnson et al. | |
| 6,263,530 B1 | 7/2001 | Feher | |
| 6,266,962 B1 | 7/2001 | Ghoshal | |
| 6,282,907 B1 | 9/2001 | Ghoshal | |
| 6,289,982 B1 | 9/2001 | Naji | |

(56) References Cited

U.S. PATENT DOCUMENTS

| | | | |
|---|---|---|---|
| 6,291,803 B1 | 9/2001 | Fourrey |
| 6,306,673 B1 | 10/2001 | Imanishi et al. |
| 6,326,610 B1 | 12/2001 | Muramatsu et al. |
| 6,336,237 B1 | 1/2002 | Schmid |
| 6,338,251 B1 | 1/2002 | Ghoshal |
| 6,341,395 B1 | 1/2002 | Chao |
| 6,347,521 B1 | 2/2002 | Kadotani et al. |
| 6,378,311 B1 | 4/2002 | McCordic |
| 6,385,976 B1 | 5/2002 | Yamamura et al. |
| 6,391,676 B1 | 5/2002 | Tsuzaki et al. |
| 6,393,842 B2 | 5/2002 | Kim et al. |
| 6,400,013 B1 | 6/2002 | Tsuzaki et al. |
| 6,402,470 B1 | 6/2002 | Kvasnak et al. |
| 6,410,971 B1 | 6/2002 | Otey |
| 6,425,527 B1 | 7/2002 | Smole |
| 6,427,449 B1 | 8/2002 | Logan et al. |
| 6,434,328 B2 | 8/2002 | Rutherford |
| 6,452,740 B1 | 9/2002 | Ghoshal |
| 6,470,696 B1 | 10/2002 | Palfy et al. |
| 6,474,073 B1 | 11/2002 | Uetsuji et al. |
| 6,481,801 B1 | 11/2002 | Schmale |
| 6,487,739 B1 | 12/2002 | Harker |
| 6,489,551 B2 | 12/2002 | Chu et al. |
| 6,490,879 B1 | 12/2002 | Lloyd et al. |
| 6,492,585 B1 | 12/2002 | Zamboni et al. |
| 6,493,888 B1 | 12/2002 | Salvatini et al. |
| 6,493,889 B2 | 12/2002 | Kocurek |
| 6,509,704 B1 | 1/2003 | Brown |
| 6,511,125 B1 | 1/2003 | Gendron |
| 6,519,949 B1 | 2/2003 | Wernlund et al. |
| 6,539,725 B2 | 4/2003 | Bell |
| 6,541,737 B1 | 4/2003 | Eksin et al. |
| 6,541,743 B2 | 4/2003 | Chen |
| 6,546,576 B1 | 4/2003 | Lin |
| 6,548,894 B2 | 4/2003 | Chu et al. |
| 6,552,256 B2 | 4/2003 | Shakouri et al. |
| RE38,128 E * | 6/2003 | Gallup | B60H 1/00478 62/261 |
| 6,571,564 B2 | 6/2003 | Upadhye et al. |
| 6,573,596 B2 | 6/2003 | Saika |
| 6,574,967 B1 | 6/2003 | Park et al. |
| 6,580,025 B2 | 6/2003 | Guy |
| 6,581,225 B1 | 6/2003 | Imai |
| 6,583,638 B2 | 6/2003 | Costello et al. |
| 6,598,251 B2 | 7/2003 | Habboub et al. |
| 6,598,405 B2 | 7/2003 | Bell |
| 6,604,576 B2 | 8/2003 | Noda et al. |
| 6,604,785 B2 | 8/2003 | Bargheer et al. |
| 6,605,955 B1 | 8/2003 | Costello et al. |
| 6,606,754 B1 | 8/2003 | Flick |
| 6,606,866 B2 | 8/2003 | Bell |
| 6,619,044 B2 | 9/2003 | Batchelor et al. |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,637,210 B2 | 10/2003 | Bell |
| 6,644,735 B2 | 11/2003 | Bargheer et al. |
| 6,672,076 B2 | 1/2004 | Bell |
| 6,676,207 B2 | 1/2004 | Rauh et al. |
| 6,684,437 B2 | 2/2004 | Koenig |
| 6,686,532 B1 | 2/2004 | Macris |
| 6,687,937 B2 | 2/2004 | Harker |
| 6,695,402 B2 | 2/2004 | Sloan, Jr. |
| 6,700,052 B2 | 3/2004 | Bell |
| 6,705,089 B2 | 3/2004 | Chu et al. |
| 6,708,352 B2 | 3/2004 | Salvatini et al. |
| 6,711,767 B2 | 3/2004 | Klamm |
| 6,711,904 B1 | 3/2004 | Law et al. |
| 6,719,039 B2 | 4/2004 | Calaman et al. |
| 6,725,669 B2 | 4/2004 | Melaragni |
| 6,727,422 B2 | 4/2004 | Macris |
| 6,730,115 B1 | 5/2004 | Heaton |
| 6,739,138 B2 | 5/2004 | Saunders et al. |
| 6,739,655 B1 | 5/2004 | Schwochert et al. |
| 6,743,972 B2 | 6/2004 | Macris |
| 6,761,399 B2 | 7/2004 | Bargheer et al. |
| 6,764,502 B2 | 7/2004 | Bieberich |
| 6,767,766 B2 | 7/2004 | Chu et al. |
| 6,772,829 B2 | 8/2004 | Lebrun |
| 6,774,346 B2 | 8/2004 | Clothier |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,793,016 B2 * | 9/2004 | Aoki | B60H 1/00285 454/907 |
| 6,804,966 B1 | 10/2004 | Chu et al. |
| 6,808,230 B2 | 10/2004 | Buss et al. |
| 6,812,395 B2 | 11/2004 | Bell |
| 6,815,814 B2 | 11/2004 | Chu et al. |
| 6,817,191 B2 | 11/2004 | Watanabe |
| 6,817,197 B1 | 11/2004 | Padfield |
| 6,817,675 B2 | 11/2004 | Buss et al. |
| 6,818,817 B2 | 11/2004 | Macris |
| 6,823,678 B1 | 11/2004 | Li |
| 6,828,528 B2 | 12/2004 | Stowe et al. |
| 6,834,509 B2 | 12/2004 | Palfy et al. |
| 6,840,305 B2 | 1/2005 | Zheng et al. |
| 6,840,576 B2 | 1/2005 | Ekern et al. |
| 6,841,957 B2 | 1/2005 | Brown |
| 6,845,622 B2 | 1/2005 | Sauciuc et al. |
| 6,855,158 B2 | 2/2005 | Stolpmann |
| 6,855,880 B2 | 2/2005 | Feher |
| 6,857,697 B2 | 2/2005 | Brennan et al. |
| 6,857,954 B2 | 2/2005 | Luedtke |
| 6,868,690 B2 | 3/2005 | Faqih |
| 6,871,365 B2 | 3/2005 | Flick et al. |
| 6,886,351 B2 * | 5/2005 | Palfy | A42B 3/24 62/140 |
| 6,892,807 B2 | 5/2005 | Fristedt et al. |
| 6,893,086 B2 | 5/2005 | Bajic et al. |
| 6,904,629 B2 | 6/2005 | Wu |
| 6,907,739 B2 | 6/2005 | Bell |
| 6,923,216 B2 | 8/2005 | Extrand et al. |
| 6,935,122 B2 | 8/2005 | Huang |
| 6,954,944 B2 | 10/2005 | Feher |
| 6,959,555 B2 | 11/2005 | Bell |
| 6,962,195 B2 | 11/2005 | Smith et al. |
| 6,963,053 B2 | 11/2005 | Lutz |
| 6,967,309 B2 | 11/2005 | Wyatt et al. |
| 6,976,734 B2 | 12/2005 | Stoewe |
| 6,977,360 B2 | 12/2005 | Weiss |
| 6,981,380 B2 | 1/2006 | Chrysler et al. |
| 6,990,701 B1 | 1/2006 | Litvak |
| 7,000,490 B1 | 2/2006 | Micheels |
| 7,036,163 B2 | 5/2006 | Schmid |
| 7,040,710 B2 | 5/2006 | White et al. |
| 7,052,091 B2 | 5/2006 | Bajic et al. |
| 7,063,163 B2 | 6/2006 | Steele et al. |
| 7,066,306 B2 | 6/2006 | Gavin |
| 7,070,231 B1 | 7/2006 | Wong |
| 7,070,232 B2 | 7/2006 | Minegishi et al. |
| 7,075,034 B2 | 7/2006 | Bargheer et al. |
| 7,082,772 B2 | 8/2006 | Welch |
| 7,084,502 B2 | 8/2006 | Bottner et al. |
| 7,100,978 B2 | 9/2006 | Ekern et al. |
| 7,108,319 B2 | 9/2006 | Hartwich et al. |
| 7,111,465 B2 | 9/2006 | Bell |
| 7,114,771 B2 | 10/2006 | Lofy et al. |
| 7,124,593 B2 | 10/2006 | Feher |
| 7,131,689 B2 | 11/2006 | Brennan et al. |
| 7,134,715 B1 | 11/2006 | Fristedt et al. |
| 7,141,763 B2 | 11/2006 | Moroz |
| 7,147,279 B2 | 12/2006 | Bevan et al. |
| 7,165,281 B2 | 1/2007 | Larsson et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,213,876 B2 | 5/2007 | Stoewe |
| 7,220,048 B2 | 5/2007 | Kohlgrüber et al. |
| 7,224,059 B2 | 5/2007 | Shimada et al. |
| 7,231,772 B2 | 6/2007 | Bell |
| 7,244,887 B2 | 7/2007 | Miley |
| 7,246,496 B2 | 7/2007 | Goenka et al. |

(56) References Cited

U.S. PATENT DOCUMENTS

| | | |
|---|---|---|
| 7,272,936 B2 | 9/2007 | Feher |
| 7,273,981 B2 | 9/2007 | Bell |
| 7,299,639 B2 | 11/2007 | Leija et al. |
| 7,337,615 B2 | 3/2008 | Reidy |
| 7,338,117 B2 | 3/2008 | Iqbal et al. |
| 7,340,907 B2 * | 3/2008 | Vogh, III ............... F25D 21/04 165/222 |
| 7,355,146 B2 | 4/2008 | Angelis et al. |
| 7,356,912 B2 | 4/2008 | Iqbal et al. |
| 7,360,365 B2 | 4/2008 | Codecasa et al. |
| 7,360,416 B2 | 4/2008 | Manaka et al. |
| 7,370,479 B2 | 5/2008 | Pfannenberg |
| 7,370,911 B2 | 5/2008 | Bajic et al. |
| 7,380,586 B2 | 6/2008 | Gawthrop |
| 7,425,034 B2 | 9/2008 | Bajic et al. |
| 7,426,835 B2 | 9/2008 | Bell et al. |
| 7,462,028 B2 | 12/2008 | Cherala et al. |
| 7,469,432 B2 | 12/2008 | Chambers |
| 7,475,464 B2 | 1/2009 | Lofy et al. |
| 7,475,938 B2 | 1/2009 | Stoewe et al. |
| 7,478,869 B2 | 1/2009 | Lazanja et al. |
| 7,480,950 B2 | 1/2009 | Feher |
| 7,506,924 B2 | 3/2009 | Bargheer et al. |
| 7,506,938 B2 | 3/2009 | Brennan et al. |
| 7,513,273 B2 | 4/2009 | Bivin |
| 7,581,785 B2 | 9/2009 | Heckmann et al. |
| 7,587,901 B2 | 9/2009 | Petrovski |
| 7,587,902 B2 | 9/2009 | Bell |
| 7,591,507 B2 | 9/2009 | Giffin et al. |
| 7,608,777 B2 | 10/2009 | Bell et al. |
| 7,621,594 B2 | 11/2009 | Hartmann et al. |
| 7,640,754 B2 | 1/2010 | Wolas |
| 7,665,803 B2 | 2/2010 | Wolas |
| 7,708,338 B2 | 5/2010 | Wolas |
| 7,731,279 B2 * | 6/2010 | Asada .................... B60N 2/448 297/180.12 |
| RE41,765 E | 9/2010 | Gregory et al. |
| 7,827,620 B2 | 11/2010 | Feher |
| 7,827,805 B2 * | 11/2010 | Comiskey ............ B60N 2/5635 62/244 |
| 7,862,113 B2 | 1/2011 | Knoll |
| 7,866,017 B2 | 1/2011 | Knoll |
| 7,877,827 B2 | 2/2011 | Marquette et al. |
| 7,927,805 B2 | 4/2011 | Raponi et al. |
| 7,937,789 B2 | 5/2011 | Feher |
| 7,963,594 B2 * | 6/2011 | Wolas .................... A47C 7/748 297/180.1 |
| 7,966,835 B2 | 6/2011 | Petrovski |
| 7,969,738 B2 | 6/2011 | Koo |
| 7,996,936 B2 | 8/2011 | Marquette et al. |
| 8,062,797 B2 | 11/2011 | Fisher et al. |
| 8,065,763 B2 | 11/2011 | Brykalski et al. |
| 8,104,295 B2 * | 1/2012 | Lofy ................... B60H 1/00592 62/3.1 |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 * | 9/2012 | Lofy .................... B60N 2/5657 62/150 |
| 8,332,975 B2 | 12/2012 | Brykalski et al. |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,605,763 B2 | 12/2013 | Castillo et al. |
| 8,621,687 B2 | 1/2014 | Brykalski et al. |
| 8,732,874 B2 | 5/2014 | Brykalski et al. |
| 8,782,830 B2 | 7/2014 | Brykalski et al. |
| 8,893,329 B2 | 11/2014 | Petrovski |
| 9,105,808 B2 | 8/2015 | Petrovski |
| 9,105,809 B2 | 8/2015 | Lofy |
| 9,121,414 B2 | 9/2015 | Lofy et al. |
| 9,125,497 B2 | 9/2015 | Brykalski et al. |
| 9,335,073 B2 | 5/2016 | Lofy |
| 9,651,279 B2 | 5/2017 | Lofy |
| 9,662,962 B2 | 5/2017 | Steinman et al. |
| 9,685,599 B2 | 6/2017 | Petrovski et al. |
| 9,814,641 B2 | 11/2017 | Brykalski et al. |
| 2001/0005990 A1 | 7/2001 | Kim et al. |
| 2001/0014212 A1 | 8/2001 | Rutherford |
| 2001/0028185 A1 | 10/2001 | Stowe et al. |
| 2002/0017102 A1 | 2/2002 | Bell |
| 2002/0062854 A1 | 5/2002 | Sharp |
| 2002/0092308 A1 | 7/2002 | Bell |
| 2002/0100121 A1 | 8/2002 | Kocurek |
| 2002/0108380 A1 | 8/2002 | Nelsen et al. |
| 2002/0121094 A1 | 9/2002 | VanHoudt |
| 2002/0195844 A1 | 12/2002 | Hipwell |
| 2003/0019044 A1 | 1/2003 | Larsson et al. |
| 2003/0039298 A1 * | 2/2003 | Eriksson ............ B60N 2/5657 374/109 |
| 2003/0041892 A1 | 3/2003 | Fleurial et al. |
| 2003/0070235 A1 | 4/2003 | Suzuki et al. |
| 2003/0084511 A1 | 5/2003 | Salvatini et al. |
| 2003/0110779 A1 | 6/2003 | Otey et al. |
| 2003/0133492 A1 | 7/2003 | Watanabe |
| 2003/0145380 A1 | 8/2003 | Schmid |
| 2003/0150060 A1 | 8/2003 | Huang |
| 2003/0160479 A1 | 8/2003 | Minuth et al. |
| 2003/0188382 A1 | 10/2003 | Klamm et al. |
| 2003/0234247 A1 | 12/2003 | Stern |
| 2004/0090093 A1 | 5/2004 | Kamiya et al. |
| 2004/0098991 A1 | 5/2004 | Heyes |
| 2004/0113549 A1 | 6/2004 | Roberts et al. |
| 2004/0164594 A1 | 8/2004 | Stoewe et al. |
| 2004/0177622 A1 | 9/2004 | Harvie |
| 2004/0177876 A1 | 9/2004 | Hightower |
| 2004/0177877 A1 | 9/2004 | Hightower |
| 2004/0195870 A1 | 10/2004 | Bohlender |
| 2004/0238022 A1 | 12/2004 | Hiller et al. |
| 2004/0255364 A1 | 12/2004 | Feher |
| 2005/0011009 A1 | 1/2005 | Wu |
| 2005/0012204 A1 | 1/2005 | Strnad |
| 2005/0056310 A1 | 3/2005 | Shikata et al. |
| 2005/0067862 A1 | 3/2005 | Iqbal et al. |
| 2005/0072165 A1 | 4/2005 | Bell |
| 2005/0076944 A1 | 4/2005 | Kanatzidis et al. |
| 2005/0078451 A1 | 4/2005 | Sauciuc et al. |
| 2005/0086739 A1 | 4/2005 | Wu |
| 2005/0121065 A1 | 6/2005 | Otey |
| 2005/0126184 A1 | 6/2005 | Cauchy |
| 2005/0145285 A1 | 7/2005 | Extrand |
| 2005/0161072 A1 | 7/2005 | Esser et al. |
| 2005/0173950 A1 | 8/2005 | Bajic et al. |
| 2005/0200166 A1 | 9/2005 | Noh |
| 2005/0202774 A1 | 9/2005 | Lipke |
| 2005/0220167 A1 | 10/2005 | Kanai et al. |
| 2005/0251120 A1 | 11/2005 | Anderson et al. |
| 2005/0257532 A1 | 11/2005 | Ikeda et al. |
| 2005/0268956 A1 | 12/2005 | Take |
| 2005/0278863 A1 | 12/2005 | Bahash et al. |
| 2005/0285438 A1 | 12/2005 | Ishima et al. |
| 2005/0288749 A1 | 12/2005 | Lachenbruch |
| 2006/0005548 A1 | 1/2006 | Ruckstuhl |
| 2006/0005944 A1 | 1/2006 | Wang et al. |
| 2006/0053529 A1 | 3/2006 | Feher |
| 2006/0078319 A1 | 4/2006 | Maran |
| 2006/0080778 A1 | 4/2006 | Chambers |
| 2006/0087160 A1 | 4/2006 | Dong et al. |
| 2006/0102224 A1 | 5/2006 | Chen et al. |
| 2006/0118158 A1 | 6/2006 | Zhang et al. |
| 2006/0123799 A1 | 6/2006 | Tateyama et al. |
| 2006/0137099 A1 | 6/2006 | Feher |
| 2006/0137358 A1 | 6/2006 | Feher |
| 2006/0157102 A1 | 7/2006 | Nakajima et al. |
| 2006/0158011 A1 | 7/2006 | Marlovits et al. |
| 2006/0162074 A1 | 7/2006 | Bader |

(56) References Cited

U.S. PATENT DOCUMENTS

| | | |
|---|---|---|
| 2006/0175877 A1 | 8/2006 | Alionte et al. |
| 2006/0197363 A1 | 9/2006 | Lofy et al. |
| 2006/0200398 A1 | 9/2006 | Botton et al. |
| 2006/0201161 A1 | 9/2006 | Hirai et al. |
| 2006/0201162 A1 | 9/2006 | Hsieh |
| 2006/0214480 A1 | 9/2006 | Terech |
| 2006/0219699 A1 | 10/2006 | Geisel et al. |
| 2006/0225441 A1 | 10/2006 | Goenka et al. |
| 2006/0225773 A1 | 10/2006 | Venkatasubramanian et al. |
| 2006/0237166 A1 | 10/2006 | Otey et al. |
| 2006/0243317 A1 | 11/2006 | Venkatasubramanian |
| 2006/0244289 A1* | 11/2006 | Bedro ............... B60N 2/5621 297/180.1 |
| 2006/0273646 A1 | 12/2006 | Comiskey et al. |
| 2007/0017666 A1 | 1/2007 | Goenka et al. |
| 2007/0035162 A1 | 2/2007 | Bier et al. |
| 2007/0040421 A1 | 2/2007 | Zuzga et al. |
| 2007/0069554 A1 | 3/2007 | Comiskey et al. |
| 2007/0086757 A1 | 4/2007 | Feher |
| 2007/0095378 A1 | 5/2007 | Ito et al. |
| 2007/0095383 A1 | 5/2007 | Tajima |
| 2007/0101602 A1 | 5/2007 | Bae et al. |
| 2007/0107450 A1 | 5/2007 | Sasao et al. |
| 2007/0138844 A1 | 6/2007 | Kim |
| 2007/0145808 A1 | 6/2007 | Minuth et al. |
| 2007/0157630 A1* | 7/2007 | Kadle ............... B60H 1/00285 62/3.3 |
| 2007/0158981 A1 | 7/2007 | Almasi et al. |
| 2007/0163269 A1 | 7/2007 | Chung et al. |
| 2007/0190712 A1 | 8/2007 | Lin et al. |
| 2007/0193279 A1 | 8/2007 | Yoneno et al. |
| 2007/0200398 A1 | 8/2007 | Wolas et al. |
| 2007/0214956 A1 | 9/2007 | Carlson et al. |
| 2007/0227158 A1 | 10/2007 | Kuchimachi |
| 2007/0234742 A1 | 10/2007 | Aoki et al. |
| 2007/0241592 A1 | 10/2007 | Giffin et al. |
| 2007/0251016 A1 | 11/2007 | Feher |
| 2007/0256722 A1 | 11/2007 | Kondoh |
| 2007/0261412 A1 | 11/2007 | Heine |
| 2007/0261413 A1 | 11/2007 | Hatamian et al. |
| 2007/0261548 A1 | 11/2007 | Vrzalik et al. |
| 2007/0262621 A1* | 11/2007 | Dong ............... A47C 7/72 297/180.12 |
| 2007/0296251 A1 | 12/2007 | Krobok et al. |
| 2008/0000025 A1 | 1/2008 | Feher |
| 2008/0022694 A1 | 1/2008 | Anderson et al. |
| 2008/0023056 A1 | 1/2008 | Kambe et al. |
| 2008/0028536 A1 | 2/2008 | Hadden-Cook |
| 2008/0028768 A1 | 2/2008 | Goenka |
| 2008/0028769 A1 | 2/2008 | Goenka |
| 2008/0053108 A1 | 3/2008 | Wen |
| 2008/0053509 A1 | 3/2008 | Flitsch et al. |
| 2008/0077211 A1 | 3/2008 | Levinson et al. |
| 2008/0078186 A1 | 4/2008 | Cao |
| 2008/0084095 A1 | 4/2008 | Wolas |
| 2008/0087316 A1 | 4/2008 | Inaba et al. |
| 2008/0148481 A1* | 6/2008 | Brykalski ............... A47C 21/048 5/423 |
| 2008/0154518 A1 | 6/2008 | Manaka et al. |
| 2008/0155990 A1 | 7/2008 | Gupta et al. |
| 2008/0163916 A1 | 7/2008 | Tsuneoka et al. |
| 2008/0164733 A1 | 7/2008 | Giffin et al. |
| 2008/0166224 A1 | 7/2008 | Giffin et al. |
| 2008/0173022 A1* | 7/2008 | Petrovski ............... B60N 2/5628 62/3.2 |
| 2008/0245092 A1 | 10/2008 | Forsberg et al. |
| 2008/0263776 A1 | 10/2008 | O'Reagan |
| 2008/0289677 A1 | 11/2008 | Bell et al. |
| 2008/0307796 A1 | 12/2008 | Bell et al. |
| 2009/0000031 A1 | 1/2009 | Feher |
| 2009/0000310 A1 | 1/2009 | Bell et al. |
| 2009/0015042 A1* | 1/2009 | Bargheer ............... B60N 2/5671 297/180.12 |
| 2009/0026813 A1 | 1/2009 | Lofy |
| 2009/0033130 A1 | 2/2009 | Marquette et al. |
| 2009/0064411 A1* | 3/2009 | Marquette ............... B60H 1/00285 5/423 |
| 2009/0106907 A1 | 4/2009 | Chambers |
| 2009/0126110 A1 | 5/2009 | Feher |
| 2009/0178700 A1 | 7/2009 | Heremans et al. |
| 2009/0193814 A1* | 8/2009 | Lofy ............... B60N 2/5692 62/3.61 |
| 2009/0211619 A1 | 8/2009 | Sharp et al. |
| 2009/0218855 A1 | 9/2009 | Wolas |
| 2009/0235969 A1 | 9/2009 | Heremans et al. |
| 2009/0269584 A1 | 10/2009 | Bell et al. |
| 2009/0293488 A1 | 12/2009 | Coughlan, III et al. |
| 2010/0011502 A1* | 1/2010 | Brykalski ............... A47C 21/044 5/423 |
| 2010/0132379 A1* | 6/2010 | Wu ............... F24F 5/0042 62/3.2 |
| 2010/0132380 A1* | 6/2010 | Robinson, II ............... B60H 1/00478 62/3.3 |
| 2010/0133883 A1* | 6/2010 | Walker ............... B60N 2/5692 297/180.1 |
| 2010/0154437 A1* | 6/2010 | Nepsha ............... F24F 5/0042 62/3.4 |
| 2010/0154911 A1 | 6/2010 | Yoskowitz |
| 2010/0198322 A1 | 8/2010 | Joseph |
| 2010/0307168 A1 | 12/2010 | Kohl et al. |
| 2011/0066217 A1 | 3/2011 | Diller et al. |
| 2011/0101741 A1* | 5/2011 | Kolich ............... B60N 2/5692 297/180.12 |
| 2011/0107514 A1* | 5/2011 | Brykalski ............... A47C 21/044 5/421 |
| 2011/0115635 A1* | 5/2011 | Petrovski ............... A47C 21/044 709/223 |
| 2011/0271994 A1 | 11/2011 | Gilley |
| 2011/0289684 A1 | 12/2011 | Parish et al. |
| 2012/0003510 A1 | 1/2012 | Eisenhour |
| 2012/0017371 A1 | 1/2012 | Pollard |
| 2012/0080911 A1 | 4/2012 | Brykalski et al. |
| 2012/0235444 A1 | 9/2012 | Dilley et al. |
| 2012/0239123 A1 | 9/2012 | Weber et al. |
| 2012/0261399 A1 | 10/2012 | Lofy |
| 2012/0289761 A1 | 11/2012 | Boyden et al. |
| 2013/0086923 A1 | 4/2013 | Petrovski et al. |
| 2013/0097776 A1 | 4/2013 | Brykalski et al. |
| 2013/0097777 A1 | 4/2013 | Marquette et al. |
| 2013/0125563 A1* | 5/2013 | Jun ............... F25B 21/04 62/3.3 |
| 2013/0239592 A1 | 9/2013 | Lofy |
| 2014/0007594 A1 | 1/2014 | Lofy |
| 2014/0026320 A1 | 1/2014 | Marquette et al. |
| 2014/0030082 A1 | 1/2014 | Helmenstein |
| 2014/0062392 A1 | 3/2014 | Lofy et al. |
| 2014/0090513 A1 | 4/2014 | Zhang et al. |
| 2014/0090829 A1 | 4/2014 | Petrovski |
| 2014/0113536 A1 | 4/2014 | Goenka et al. |
| 2014/0131343 A1 | 5/2014 | Walsh |
| 2014/0137569 A1 | 5/2014 | Parish et al. |
| 2014/0159442 A1 | 6/2014 | Helmenstein |
| 2014/0180493 A1 | 6/2014 | Csonti et al. |
| 2014/0187140 A1 | 7/2014 | Lazanja et al. |
| 2014/0194959 A1 | 7/2014 | Fries et al. |
| 2014/0237719 A1 | 8/2014 | Brykalski et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0310874 A1 | 10/2014 | Brykalski et al. |
| 2014/0338366 A1 | 11/2014 | Adldinger et al. |
| 2015/0013346 A1 | 1/2015 | Lofy |
| 2015/0121902 A1 | 5/2015 | Steinman |
| 2015/0176870 A1 | 6/2015 | Inaba et al. |
| 2015/0238020 A1 | 8/2015 | Petrovski et al. |
| 2016/0030234 A1 | 2/2016 | Lofy et al. |
| 2016/0053772 A1 | 2/2016 | Lofy et al. |
| 2016/0137110 A1* | 5/2016 | Lofy ............... B60N 2/5635 62/3.3 |
| 2016/0320140 A1 | 11/2016 | Lofy |

(56) References Cited

U.S. PATENT DOCUMENTS

| | | | |
|---|---|---|---|
| 2017/0071359 A1 | 3/2017 | Petrovski et al. | |
| 2017/0284710 A1 | 10/2017 | Petrovski et al. | |
| 2017/0291467 A1 | 10/2017 | Steinman et al. | |

FOREIGN PATENT DOCUMENTS

| | | | |
|---|---|---|---|
| DE | 195 03 291 | | 8/1996 |
| DE | 199 12 764 | | 9/2000 |
| DE | 299 11 519 | | 11/2000 |
| DE | 102 38 552 | | 8/2001 |
| DE | 101 15 242 | | 10/2002 |
| DE | 201 20 516 | | 4/2003 |
| DE | 102009036332 A1 | * | 8/2009 |
| DE | 10 2009 036 332 | | 2/2011 |
| EP | 0 424 160 | | 4/1991 |
| EP | 0 411 375 | | 5/1994 |
| EP | 0 621 026 | | 10/1994 |
| EP | 0 834 421 | | 4/1998 |
| EP | 0 862 901 | | 9/1998 |
| EP | 1 598 223 | | 11/2005 |
| EP | 1 972 312 | | 9/2008 |
| EP | 1 845 914 | | 9/2009 |
| EP | 2 073 669 | | 11/2012 |
| EP | 2 921 083 | | 9/2015 |
| FR | 2 893 826 | | 6/2007 |
| GB | 874660 | | 8/1961 |
| GB | 978057 | | 12/1964 |
| JP | 56-097416 | | 8/1981 |
| JP | 60-080044 | | 5/1985 |
| JP | 60-085297 | | 5/1985 |
| JP | 01-281344 | | 11/1989 |
| JP | 04-052470 | | 6/1990 |
| JP | 04-165234 | | 6/1992 |
| JP | 05-026762 | | 2/1993 |
| JP | 05-277020 | | 10/1993 |
| JP | 10044756 A | * | 2/1998 |
| JP | 10-227508 | | 8/1998 |
| JP | 10-297243 | | 11/1998 |
| JP | 10-332883 | | 12/1998 |
| JP | 2000-060681 | | 2/2000 |
| JP | 2000-164945 | | 6/2000 |
| JP | 2001-174028 | | 6/2001 |
| JP | 2001-208405 | | 8/2001 |
| JP | 2002-514735 | | 5/2002 |
| JP | 2002-227798 | | 8/2002 |
| JP | 2003-204087 | | 7/2003 |
| JP | 2003-254636 | | 9/2003 |
| JP | 2004-055621 | | 2/2004 |
| JP | 2004-174138 | | 6/2004 |
| JP | 2005-079210 | | 2/2005 |
| JP | 2005-333083 | | 12/2005 |
| JP | 2006-001392 | | 1/2006 |
| JP | 2006-021572 | | 1/2006 |
| JP | 2006-076398 | | 3/2006 |
| KR | 2001-0060500 | | 7/2001 |
| KR | 20050011494 A | * | 1/2005 |
| LU | 66619 | | 2/1973 |
| WO | WO 94/020801 | | 9/1994 |
| WO | WO 95/014899 | | 6/1995 |
| WO | WO 95/031688 | | 11/1995 |
| WO | WO 96/005475 | | 2/1996 |
| WO | WO 98/007898 | | 2/1998 |
| WO | WO 98/0031311 | | 7/1998 |
| WO | WO 99/023980 | | 5/1999 |
| WO | WO 99/044552 | | 9/1999 |
| WO | WO 99/058907 | | 11/1999 |
| WO | WO 02/011968 | | 2/2002 |
| WO | WO 02/053400 | | 7/2002 |
| WO | WO 02/058165 | | 7/2002 |
| WO | WO 03/014634 | | 2/2003 |
| WO | WO 03/051666 | | 6/2003 |
| WO | WO 03/063257 | | 7/2003 |
| WO | WO 2004/011861 | | 2/2004 |
| WO | WO 2005/115794 | | 12/2005 |
| WO | WO 2006/078394 | | 7/2006 |
| WO | WO 2007/060371 | | 5/2007 |
| WO | WO 2007/089789 | | 8/2007 |
| WO | WO 2008/045964 | | 4/2008 |
| WO | WO 2008/046110 | | 4/2008 |
| WO | WO 2008/057962 | | 5/2008 |
| WO | WO 2008/076588 | | 6/2008 |
| WO | WO 2008/086499 | | 7/2008 |
| WO | WO 2008/115831 | | 9/2008 |
| WO | WO 2009/015235 | | 1/2009 |
| WO | WO 2009/036077 | | 3/2009 |
| WO | WO 2009/097572 | | 8/2009 |
| WO | WO 2010/009422 | | 1/2010 |
| WO | WO 2010/088405 | | 8/2010 |
| WO | WO 2010/129803 | | 11/2010 |
| WO | WO 2011/026040 | | 3/2011 |
| WO | WO 2011/156643 | | 12/2011 |
| WO | WO 2012/061777 | | 5/2012 |
| WO | WO 2013/052823 | | 4/2013 |
| WO | WO 2014/164887 | | 10/2014 |

OTHER PUBLICATIONS

U.S. Appl. No. 15/145,445, filed May 3, 2016, Lofy.
Feher, Steve, "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.
Lofy et al., "Thermoelectrics for Environmental Control in Automobiles", Proceeding of Twenty-First International Conference on Thermoelectrics (ICT 2002), 2002, pp. 471-476.
Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
Japanese Office Action re JP Patent Application No. 2011-518941, dated Oct. 18, 2013, along with its English translation as translated by a foreign associate.
U.S. Appl. No. 15/213,281, filed Jul. 18, 2016, Petrovski.
U.S. Appl. No. 15/467,830, filed Mar. 23, 2017, Brykalski et al.
U.S. Appl. No. 15/495,787, filed Apr. 24, 2017, Steinman et al.
U.S. Appl. No. 14/821,514, filed Aug. 7, 2015, Lofy.
U.S. Appl. No. 15/685,912, filed Aug. 24, 2017, Petrovski et al.

* cited by examiner

MOISTURE ABATEMENT IN HEATING OPERATION OF CLIMATE CONTROLLED SYSTEMS

CROSS REFERENCE TO RELATED APPLICATIONS

This application claims the priority benefit under 35 U.S.C. § 119(e) of U.S. Provisional Application No. 61/597,568, filed Feb. 10, 2012, the entirety of which is hereby incorporated by reference.

FIELD OF THE INVENTIONS

This application relates generally to climate control, and more specifically, to climate control utilizing a thermoelectric circuit.

DESCRIPTION OF THE RELATED ART

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide individualized climate control for an occupant seat so that substantially instantaneous heating or cooling can be achieved. For example, an automotive vehicle exposed to the summer weather, especially where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, occupant's back and other pressure points may remain sweaty while seated. In the winter time, it may be desirable to quickly warm the seat of the occupant in order to enhance an occupant's comfort. This is particularly true where a typical vehicle heater is unlikely to quickly warm the vehicle's interior. For these and other reasons, there have long been various types of individualized climate control systems for vehicle seats. More recently, individualized climate control systems have been extended to beds, chairs, wheelchairs, other medical beds or chairs and the like.

Such climate control systems typically include a distribution system comprising a combination of channels and passages formed in one or more cushions of a seat. Climate conditioned air can be supplied to these channels and passages by using a climate controlled device. Climate conditioned air flows through the channels and passages to cool or heat the space adjacent to the surface of the vehicle seat.

There are, however, problems that have been experienced with existing climate control systems. For example, some control systems utilize thermoelectric devices (TEDs) that can have a variety of configurations on the hot and main sides of the device. For configurations in which there is a heat exchanger on the main side with air flowing past it, condensation may form from water in the air. Whether or not condensation will occur and how much condensation will occur depends on the ambient air conditions (e.g., temperature and relative humidity) and the amount of temperature reduction from the inlet of the main side heat exchanger to the outlet. This condensation often can have undesirable consequences, from corrosion on metal parts to the creation of mold. Condensation may also partially or totally block airflow at the fin passages on the main side of the TED, resulting in reduction or loss of function.

SUMMARY

U.S. Pat. Nos. 8,104,295, 8,605,763, 7,927,805 and 7,963,594 (the entirety of these patents are hereby incorporated by reference herein in their entirety) disclose systems in which a thermoelectric (TE) device (TED) is used to heat and/or cool a bed, vehicle seat, a chair, and/or a cup holder or container. When running the TED in heating mode, the waste side of the TED can achieve temperatures below that of the main side and, if humidity levels are sufficient, condensate can form on the heat exchanger. The formation of the water droplets can restrict the airflow across the heat exchanger and cause a further reduction in temperature due to reduced airflow. If the TED temperature levels fall below 0° C., ice formation begins, further restricting or even preventing air flow across the waste side of the heat exchanger.

Various embodiments for addressing one or more or additional problems described above are described herein including a climate control system (e.g., for a climate controlled seat, bed or other seating assembly, a thermally conditioned cup holder or other compartment, etc.) comprising a thermal conditioning device (e.g., thermoelectric device, convective heater, another type of heating device, etc.) having at least a first surface and a second surface. Some embodiments of the system also include a power source (e.g., a vehicle's electrical system, a battery, or otherwise) configured to provide power to the thermal conditioning device. Certain embodiments further include a processor (e.g., a controller or other circuit configured to execute one or more algorithms) configured to control (e.g., increase, decrease, generally maintain, or otherwise) the power source based partly or completely on, for example, a relative humidity reading, the presence or absence of condensation, a dew point calculation, or otherwise.

According to some embodiments, a method of controlling a climate control system (e.g., for a climate controlled seat, bed or other seating assembly, a thermally conditioned cup holder or other compartment, etc.) includes providing a climate control system configured to operate in a heating mode. The climate control system includes a housing (e.g., enclosure, shell, etc.) defining an interior space, the housing having at least one inlet and at least one outlet.

In some embodiments, the system further includes a thermal conditioning device, such as a thermoelectric device, convective heater, radiant heater, or another type of heating device. The thermal conditioning device can be positioned partially or completely within the interior space. The thermal conditioning device can include at least a first surface and a second surface. The second surface can be configured to achieve a temperature that is less than (e.g., by at least about: 1° C., 2° C., 4° C., 5° C., 6° C., 7° C., 8° C., 9° C., 10° C., values between the aforementioned values, or otherwise) a temperature of the first surface during the heating mode. In some embodiments, the system includes a power source (e.g., a vehicle's electrical system, a battery, or otherwise) that is configured to supply power (e.g., alternating or direct current electricity) to the thermal conditioning device. In some embodiments, the first surface is in thermal communication with a first heat exchanger (e.g., a main side heat exchanger) and/or the second surface is in thermal communication with a second heat exchanger (e.g., a waste side heat exchanger).

In some embodiments, the system includes a fluid transfer device configured to selectively transfer fluid from the inlet to the outlet of the housing, wherein fluid passing through the interior space of the housing is heated when the thermal conditioning device is activated (e.g., enabled, energized, operating, turned-on, or otherwise). In some embodiments, the fluid transfer device includes a motor assembly, such as an electric motor, pneumatic motor, internal combustion motor, or otherwise). In certain variants, the motor assembly is located partially or completely within the interior space. The motor assembly can be configured to selectively drive (e.g., rotate) a fluid motivating device, such as an impeller. For example, the motor assembly can be coupled, directly or indirectly (e.g., via a gear train) with the impeller. The fluid transfer device can include a plurality of blades, wings, scoops, or otherwise. The fluid transfer device can be configured to draw a fluid (e.g., heated or cooled air, ambient air, water or another liquid, or another fluid) into the interior space of the housing via the inlet and to discharge at least some of the fluid from the interior space via the outlet.

Some embodiments of the method also include operating the climate control system in the heating mode. Certain embodiments further include detecting (e.g., measuring, ascertaining, observing, or otherwise) the relative humidity at or near a location, such as the interior space, the inlet or outlet of the housing, the main or waste side heat exchanger, or the first and/or second surface of the thermal conditioning device. Some embodiments include detecting the relative humidity of an occupied space (e.g., a passenger cabin).

Certain implementations of the method include comparing the relative humidity to a threshold humidity value (e.g., greater than or equal to about: 60%, 65%, 70%, 75%, 80%, 85%, 90%, 95%, values between the aforementioned values, or otherwise). In some embodiments, the method includes reducing (e.g., by greater than or equal to about: 50%, 60%, 70%, 80%, 90%, values between the aforementioned values, or otherwise) an amount of power supplied to the thermal conditioning device when the relative humidity is about equal to or greater than the threshold humidity value. In some embodiments, such a reduction of the power includes substantially eliminating the power supplied to the thermal conditioning device. Certain implementations include increasing (e.g., by at least about: 10%, 20%, 30%, 40%, 50%, values between the aforementioned values, or otherwise) or generally maintaining the amount of power supplied to the thermal conditioning device when the relative humidity is less than the threshold humidity value.

In some embodiments of the method, measuring the relative humidity includes measuring the relative humidity with a humidity sensor (e.g., analog sensor, digital sensor, or otherwise). In certain variants of the method, reducing the amount of power supplied to the thermal conditioning device is accomplished by decreasing a duty cycle (e.g., by at least about: 10%, 20%, 30%, 40%, 50%, values between the aforementioned values, or otherwise) of the thermal conditioning device. In some implementations of the method, increasing or generally maintaining the amount of power supplied to the thermal conditioning device is accomplished by increasing (e.g., by at least about: 10%, 20%, 30%, 40%, 50%, values between the aforementioned values, or otherwise) or generally maintaining a duty cycle of the thermal conditioning device. Some embodiments of the method do not include measuring a temperature (e.g., with a temperature sensor). Certain implementations of the method do not include determining (e.g., calculating) a dew point.

According to some embodiments, a climate control system (e.g., for a climate controlled seat, bed or other seating assembly, a thermally conditioned cup holder or other compartment, etc.) that is configured to operate in a heating mode can include a housing defining an interior space and including an inlet and an outlet. In certain variants, the thermal conditioning device can be positioned partially or completely in the interior space. In some embodiments, the thermal conditioning device has at least a first surface and a second surface, the second surface being configured to achieve a temperature less than a temperature of the first surface during the heating mode. In some embodiments, the first surface is in thermal communication with a first heat exchanger (e.g., a main side heat exchanger) and/or the second surface is in thermal communication with a second heat exchanger (e.g., a waste side heat exchanger).

Some implementations of the system also include a fluid transfer device, such as an impeller, which can include a plurality of blades. The fluid transfer device can be configured to selectively (e.g., when the climate control system is active) transfer fluid from the inlet to the outlet of the housing, wherein at least some of the fluid passing through the interior space of the housing is heated when the thermal conditioning device is activated (e.g., enabled, energized, operating, turned-on, or otherwise). Certain variants also include a power source (e.g., a vehicle's electrical system, a battery, or otherwise) configured to supply electrical power to at least one of the thermal conditioning device and the fluid transfer device. In some embodiments, the system includes a humidity sensor, such as an integrated circuit humidity sensor. Certain implementations include a processor that is configured to directly or indirectly receive a humidity reading (e.g., a voltage signal) from the humidity sensor and to control (e.g., to determine whether to increase or decrease) the electrical power supplied by the power source.

In some embodiments of the climate control system, when the system is operating in a heating mode and the humidity reading is about equal to or greater than a humidity threshold (e.g., a relative humidity of between about 85% and about 95%, or greater than or equal to about: 60%, 65%, 70%, 75%, 80%, 85%, 90%, 95%, values between the aforementioned values, or otherwise), the power supplied to the thermal conditioning device is reduced (e.g., by greater than or equal to about: 50%, 60%, 70%, 80%, 90%, values between the aforementioned values, or otherwise). In some implementations, the humidity threshold is a relative humidity of approximately 90% (e.g., greater than or equal to about: 89.0%, 89.1%, 89.2%, 89.3%, 89.4%, 89.5%, 89.6%, 89.7%, 89.8%, 89.9%, 90.0%, 90.1%, 90.2%, 90.3%, 90.4%, 90.5%, 90.6%, 90.7%, 90.8%, 90.9%, 91.0%, values between the aforementioned values, or otherwise).

In some embodiments of the system, when the system is operating in the heating mode and the humidity reading is less than the humidity threshold, the power supplied to the thermal conditioning device is increased (e.g., by at least about: 10%, 20%, 30%, 40%, 50%, values between the aforementioned values, or otherwise) or generally maintained.

In certain implementations of the system, the thermal conditioning device is adapted to provide heating and cooling, such as a thermoelectric device. In some implementations, the thermal conditioning device is adapted to provide heating only, such as a convective heater, radiant heater, or otherwise.

In some implementations, the humidity reading is a relative humidity reading, absolute humidity reading, or specific humidity reading. The humidity sensor can be configured to detect (e.g., measure, ascertain, observe, or otherwise) the humidity at various locations, such as at or near: the interior space, the inlet or outlet of the housing, the main or waste side heat exchanger, or the first or second surfaces of the thermal conditioning device. In some embodiments, when the system is operating in heating mode and the humidity reading is about equal to or greater than a humidity threshold, the power supplied to the thermal conditioning device is reduced (e.g., to less than or equal to a duty cycle of about: 30%, 35%, 40%, 45%, 50%, 55%, 60%, 65%, values between the aforementioned values, or otherwise). In some embodiments, when the system is operating in heating mode and the humidity reading is less than the humidity threshold, the power supplied to the thermal conditioning device is increased (e.g., modulated up to a duty cycle that is greater than or equal to about 80%, 85%, 90%, 95%, 100%, values between the aforementioned values, or otherwise) or generally maintained (e.g., sustained at a duty cycle that is greater than or equal to about 80%, 85%, 90%, 95%, 100%, values between the aforementioned values, or otherwise).

In some implementations, a climate control system is configured to operate in a heating mode and includes one or more of: a housing, a thermal conditioning device, a fluid transfer device, a power source, and a condensate switch. The housing can define an interior space and can have an inlet and an outlet. The thermal conditioning device can be partially or completely positioned in the interior space. Some embodiments of the conditioning device have at least a first surface and a second surface. The second surface can be configured to achieve a temperature less than a temperature of the first surface during the heating mode. The fluid transfer device can be configured to selectively transfer fluid from the inlet to the outlet of the housing, wherein fluid passing through the interior space of the housing is heated when the thermal conditioning device is activated. In some embodiments, the fluid transfer device includes a plurality of blades. The power source can be configured to supply electric power to the thermal conditioning device, the fluid transfer device, or both. In some embodiments, the system does not include a processor (e.g., a controller or other electronic circuit that executes programs). Some embodiments do not include a temperature sensor.

Certain embodiments of the condensate switch can be configured to toggle (e.g., alternate, oscillate) between a first state and a second state. According to some embodiments, the first state occurs when condensation is detected, such as when a signal falls below or exceeds a limit or when a monitored characteristic (e.g., capacitance, voltage, or resistance) changes. According to certain variants, the second state occurs when condensation is not detected, such as when a signal does not fall below or exceed a limit, or when a monitored characteristic (e.g., capacitance, voltage, or resistance) has a generally constant status. In certain implementations, when the condensate switch is in the first state and the system is operating in the heating mode, the condensate switch is configured to interrupt (e.g., reduce or eliminate) power supplied to the thermal conditioning device. In some embodiments, when the condensate switch is in the second state and the system is operating in the heating mode, the condensate switch is configured to allow (e.g., increase or generally maintain) power supplied to the thermal conditioning device. In some embodiments, the condensate switch is located at or near: the interior space, the inlet or outlet of the housing, the first or second surfaces of the thermal conditioning device, or a user-occupied space (e.g., a vehicle interior, an upper surface of a bed, etc.). In certain variants, the condensate switch is located at or near an input to the thermal conditioning device.

In some embodiments, when the condensate switch interrupts power supplied to the thermal conditioning device, an amount of power is supplied to the thermal conditioning device that is less than the power supplied to the thermal conditioning device when the condensate switch is in the second state. For example, the power supplied to the thermal conditioning device can be reduced by at least about: 10%, 25% 40%, 50%, 65%, 75%, 90%, 95%, values between the aforementioned values, or otherwise. In certain implementations, when the condensate switch interrupts power supplied to the thermal conditioning device, the power supplied to the thermal conditioning device is generally eliminated. In some embodiments, when the condensate switch toggles from the first state to the second state, the supply of power to the thermal conditioning device resumes. For example, the condensate switch can be configured to toggle back and forth between the first and second states, whereby the thermal conditioning device de-energized (when the switch is in the first state) and energized or re-energized (when the switch is in the second state).

In some embodiments, a climate control system can be configured for use in an ambient temperature range between (e.g., between about 0° C. and about 45° C., between about 10° C. and about 38° C., between about 14° C. and about 34° C., or otherwise). In certain embodiments, the system includes a housing defining an interior space, the housing having at least one inlet and at least one outlet. The system can also include a thermal conditioning device (e.g., thermoelectric device, convective heater, radiant heater, or otherwise) having at least a first surface and at least a second surface. The second surface can be configured to achieve a temperature less than a temperature of the first surface when the system operates in a heating mode.

Some variants of the system include a fluid transfer device configured to selectively transfer fluid from the inlet to the outlet of the housing, wherein fluid passing through the interior space of the housing is heated when the thermal conditioning device is activated. For example, certain variants of the system include an electric motor assembly located within the interior space and including a fluid motivating portion, such as an impeller. The fluid motivating portion can have a plurality of blades. In some embodiments, the fluid motivating portion is directly or indirectly coupled with the motor assembly, which can be configured to selectively rotate the fluid motivating portion to draw a fluid into the interior space of the housing via the inlet and to discharge the fluid from the interior space via the outlet.

In some embodiments, the system includes and/or is configured to interface with a power supply configured to supply electric power to the thermal conditioning device. In certain implementations, throughout the ambient temperature range of the system, the power supply is configured to supply a sufficient amount of power (e.g., greater than or equal to about 60 W, 65 W, 70 W, 75 W, 80 W, 85 W, 90 W, 95 W, 100 W, 105 W, 110 W, 115 W, values between the aforementioned values, or otherwise) to the thermal conditioning device to generally maintain the second surface of the thermal conditioning device at a temperature that is greater than the temperature at which condensation would occur on the second surface. For example, if it is determined (e.g., by a calculation, lookup table, or otherwise) that condensation could occur at a temperature of about 60° F., then the power supply can be configured to supply a sufficient amount of power to the thermal conditioning device to generally maintain the second surface of the thermal conditioning device at a temperature that is greater than about 60° F. In some embodiments, the power supply is configured to supply at least about 80 Watts to the thermal conditioning device. In some embodiments, the power supply is configured to supply at least about 95 Watts to the thermal conditioning device. In some embodiments, the power supply is configured to supply at least about 135 Watts to the thermal conditioning device. In some embodiments, the power supply is configured to supply at least about 150 Watts to the thermal conditioning device.

Certain variants of the system include a plurality of thermal conditioning devices. In some variants, all or at least some of the plurality thermal conditioning devices are electrically connected in parallel when the system operates in certain conditions (e.g., in the heating mode). In some implementations, all or at least some of the plurality thermal conditioning devices are electrically connected in series when the system operates in certain conditions (e.g., in a cooling mode).

In some embodiments, a climate control system includes a housing defining an interior space, the housing having at least one inlet and at least one outlet. Some variants include a thermal conditioning device (e.g., a thermoelectric device, convective heater, or otherwise) positioned in the interior space and having a first surface and a second surface, the second surface being configured to achieve a temperature less than a temperature of the first surface when the system operates in a heating mode.

Certain implementations include a fluid transfer device (e.g., an impeller, fan, blower, or otherwise), which can have a plurality of blades. The fluid transfer device can be configured to selectively transfer fluid from the inlet to the outlet of the housing, wherein fluid passing through the interior space of the housing is heated when the thermal conditioning device is activated. Some embodiments include a power supply configured to supply electric power to at least one of the fluid transfer device and the thermal conditioning device.

Some embodiments also include a processor, such as a controller or other electronic circuit that executes one or more algorithms. The processor can be configured to control the power supplied to the thermal conditioning device. In some variants, the processor is configured to determine a dew point, such as by a calculation, lookup table, or otherwise. In some embodiments, when the climate control system is operating in the heating mode and the temperature of the second surface is determined to be within a range (e.g., less than or equal to about: 0.25%, 0.5%, 1%, 2%, 3%, 4%, 5%, 6%, 7%, 8%, 9%, 10%, values between the aforementioned values, or otherwise) of the dew point, the processor is configured to reduce (e.g., decrease or eliminate) the amount of power supplied by at least one of the thermal conditioning device and the fluid transfer device.

In some embodiments, the climate control system includes a temperature sensor, such as a dry bulb temperature sensor, wet bulb temperature sensor, thermistor, or otherwise. In certain embodiments, the climate control system includes a humidity sensor. Certain implementations of the system are configured to determine (e.g., calculate) dew point. For example, some embodiments are configured to determine dew point based on ambient dry bulb temperature data from the temperature sensor and relative humidity data from the humidity sensor. In some embodiments, the dew point is determined from a table, such as a table listing known ambient temperature and corresponding relative humidity values at which the second side of the thermal conditioning device achieves the dew point.

BRIEF DESCRIPTION OF THE DRAWINGS

These and other features, aspects and advantages of the present inventions are described herein in connection with certain preferred embodiments, in reference to the accompanying drawings. The illustrated embodiments, however, are merely examples and are not intended to limit the inventions. The drawings include the following figures.

DETAILED DESCRIPTION OF SOME EMBODIMENTS

A variety of examples described below illustrate various configurations that may be employed to achieve desired improvements. The particular embodiments and examples are only illustrative and not intended in any way to restrict the general inventions presented and the various aspects and features of these inventions. In addition, it should be understood that the terms cooling side, heating side, main side, waste side, cooler side and hotter side and the like do not indicate any particular temperature, but are relative terms. For example, the "hot," "heating" or "hotter" side of a thermoelectric device or array may be at ambient temperature, with the "cold," "cooling" or "cooler" side at a cooler temperature than ambient. Conversely, the "cold," "cooling" or "cooler" side may be at ambient with the "hot," "heating" or "hotter" side at a higher temperature than ambient. Thus, the terms are relative to each other to indicate that one side of the thermoelectric device is at a higher or lower temperature than the counter or opposing side. Moreover, as is known in the art, when the electrical current in a thermoelectric device is reversed, heat can be transferred to the "cold" side of the device, while heat is drawn from the "hot" side of the device. In addition, fluid flow is referenced in the discussion below as having directions. When such references are made, they generally refer to the direction as depicted in the two dimensional figures. The terminology indicating "away" from or "along" or any other fluid flow direction described in the application is meant to be an illustrative generalization of the direction of flow as considered from the perspective of two dimensional figures.

Figure 1:
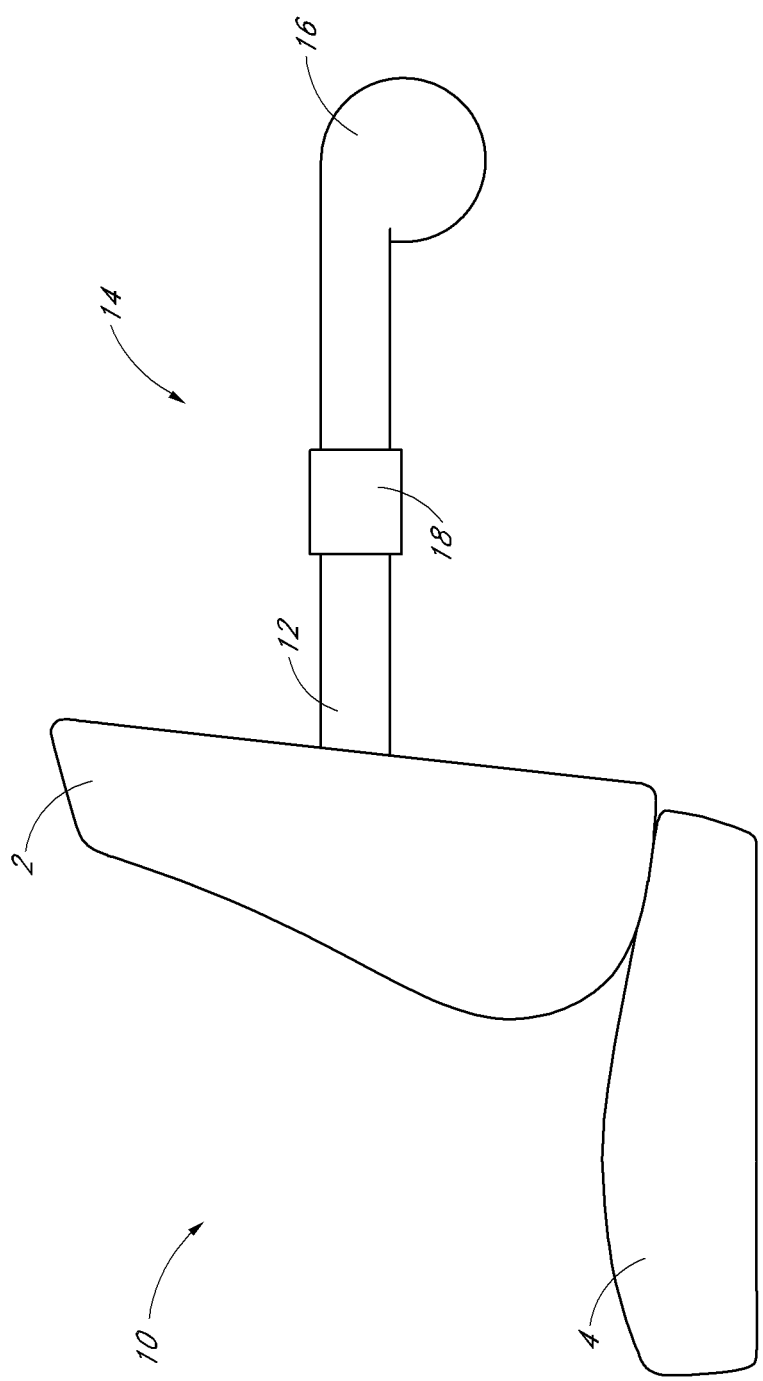
FIG. 1 illustrates a side schematic view of a climate controlled vehicle seat according to one embodiment.

FIG. 1 is a schematic diagram of a climate controlled vehicle seat 10. The depicted climate controlled vehicle seat assembly 10 includes a seat back 2, a seat bottom 4, a fluid distribution system 12 and a fluid module 14. The terms "fluid module" and "thermal module" are used interchangeably herein. The fluid module 14 can include, among other things, a fluid transfer device 16 and a thermoelectric device (TED) 18 (or another type of thermal conditioning member or device). The fluid module and/or its components can be controlled by one or more processors or controllers (not shown), which can be internal and/or external to the module. The fluid transfer device 16 comprises, for example, a blower or a fan. FIG. 1 illustrates one embodiment of a climate controlled vehicle seat 10 wherein air or other fluids, which are thermally conditioned by the fluid module 14, can be selectively transferred from the fluid module 14, through a fluid distribution system 12 and toward an occupant positioned on the vehicle seat assembly 10. While components of the fluid module 14 (e.g., the TED 18, fluid transfer device 16, the distribution system 12) are illustrated outside the seat 10, one or more of these components can be positioned entirely or partially within the seat 10, as desired or required.

As illustrated in FIG. 1, the seat assembly 10 can be similar to a standard automotive seat. However, it should be appreciated that certain features and aspects of the seat assembly 10 described herein may also be used in a variety of other applications and environments. For example, certain features and aspects of the seat assembly 10 may be adapted for use in other vehicles, such as airplanes, trains, boats and/or the like. In other arrangements, as discussed in greater detail herein, the seat assembly 10 can include a bed (FIG. 2), a medical bed, a chair, a couch, a wheelchair, another medical bed or chair and/or any other device configured to support one or more occupants.

Figure 2:
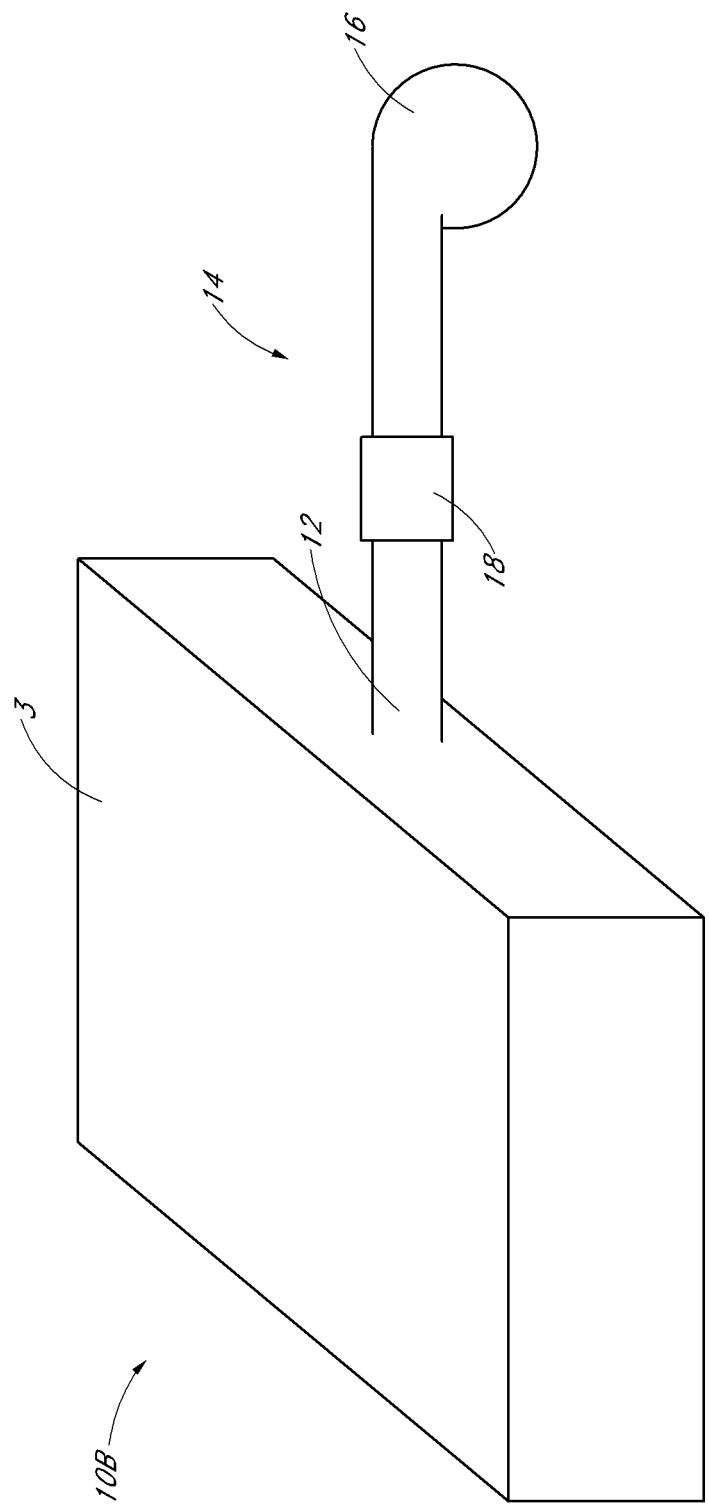
FIG. 2 illustrates a perspective schematic view of a climate controlled bed according to one embodiment.

For instance, FIG. 2 illustrates a schematic diagram of a climate controlled bed 10B. The depicted arrangement of a climate controlled bed 10B includes a support portion (e.g., cushion) 3, one or more fluid distribution systems 12 and one or more fluid modules 14. The fluid module 14 can include a fluid transfer device 16 (e.g., a fan, blower, etc.), a TED 18 and any other devices or components (e.g., sensors), as desired or required. FIG. 2 schematically illustrates a configuration of a climate controlled bed 10B wherein the fluid module 14 is conditioned and transferred from the fluid module 14, through the fluid distribution system 12 to the ultimate user sitting or lying on the bed 10B.

With continued reference to FIG. 2, the bed assembly 10B can be similar to a standard bed (e.g., a foam bed, a spring mattress bed, a latex bed, a medical bed or topper, etc.). However, one or more features and aspects of the bed assembly 10B described herein may also be used in a variety of other applications and environments. For example, certain features and aspects of the bed assembly 10B may be adapted for use in other stationary environments, such as a chair, a sofa, a theater seat, and an office seat that is used in a place of business and/or residence.

Figure 3:
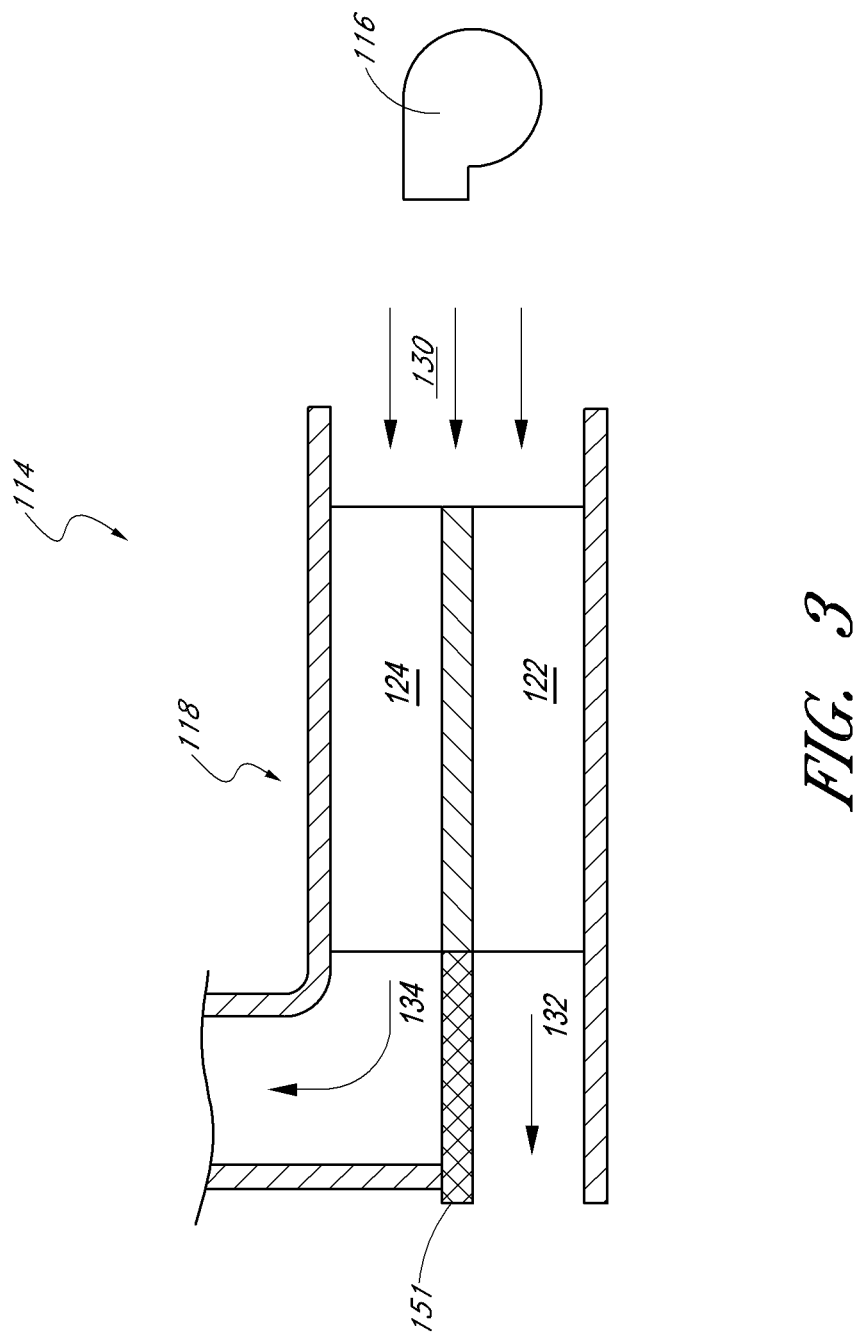
FIG. 3 illustrates a partial cross-sectional view of a fluid module according to one embodiment.

With reference to FIG. 3, a fluid transfer device 116 of a fluid module 114 can be configured to provide a fluid, such as air, to an inlet 130 of a TED 118. As discussed in greater detail herein, the TED 118 can include a hot side 124 and a cold side 122. Fluids being directed through the fluid module 114 are generally divided between the hot side 124 and the cold side 122. During a heating operation, the hot side 124 can be called the "main" side and the cold side 122 can be called the "waste" side. In some embodiments, fluids can leave the hot side 124 via a hot side outlet 134 that leads to the fluid distribution system 112 of a seat assembly 10. On the other hand, from the cold side 122 of the TED 118, fluids can leave via a cold side outlet 132 that may be in fluid communication with a waste duct. Such a waste duct can convey the fluids to an area where they will not affect the user of the conditioning system or the operation of the conditioning system itself.

According to certain arrangements, fluids are selectively thermally-conditioned as they pass across, through and/or near the TED 118 (or another type of thermal conditioning device, e.g., convective heater, another cooling and/or heating device, etc.). Thus, fluids leaving the TED 118 through the cold side outlet 132 are relatively cold, and fluids leaving the TED 118 through the hot side outlet 134 are relatively warm. Further, a separator gasket 151 can be generally positioned between the cold side outlet 132 and the hot side outlet 134. The separator gasket 151 can comprise a foam (e.g., closed cell, open cell, etc.) and/or any other material. In certain arrangements, the separator gasket 151 is used to both separate the hot and cold fluid flows and to thermally isolate them. In any of the embodiments disclosed herein, a TED can be replaced by another type of thermal conditioning device (e.g., a convective heater, another heating and/or cooling device, etc.).

In order to achieve the heating/cooling effect noted above, the TED 118 can receive electric power from a power source (not shown). In some embodiments, the power source is configured to supply the TED 118 with at least about: 14V, 16V, 18V, 20V, values in between the foregoing, less that 14V, more than 20V and/or any other voltage. In certain implementations, between about 5V and about 15V is supplied to the TED 118. According to some embodiments, the power source is configured to provide between about 15V and about 20V to the TED 118. In some variants, during a heating mode and during operation of the TED 118, at least about 15V is supplied to the TED 118. Certain systems are configured to supply greater than about 18V (e.g., approximately 18V, 20V, 22V, 24V, more than 24V, values between the foregoing values, etc.) to the TED 118. In some implementations, the power supply can provide at least about 9 A of electric current to the TED 118.

Condensate Wicking

With continued reference to FIG. 3, problems may arise when the temperature on the cold side 122 of a TED 118 is less than the dew point, which is the temperature below which the water vapor in a volume of humid air at a constant barometric pressure will condense into liquid water. For example, when the temperature of the cold side 122 is less than the dew point, then condensation can form. The condensation may form, for example, within the TED 118, in the cold side outlet 132 and/or at any other location within or near the TED 118 or the fluid module 114.

Condensation formed within a fluid module 114 can cause a number of potential problems. For example, a plurality of fins can be provided along the cold side 122 and/or the hot side 124 of a TED 118 to help transfer heat to or from air or other fluids passing through a fluid module 114. Based on the temperature variations within a TED 118, condensation can form on the fins, generally decreasing the effective surface area of the fins. Consequently, the flow of air or other fluids through the cold side 122 of the TED 118 can be partially or completely impeded. Under such conditions, the temperature on the cold side 122 may decrease to the point where ice forms within the TED 118 and/or along the cold side outlet 132. Ice formation may further limit fluid flow through the fluid module 114, and thus, may undesirably prevent the thermal conditioning system from functioning properly.

Additionally, as condensation forms, it may pool or otherwise collect on or within the TED 118 and/or other portions of the thermal module 114. In some embodiments, condensed water or other fluid can move to other downstream locations of the seat assembly where it can cause further problems. For example, such condensate can be transferred to the fluid distribution system and/or the cushion of a seat assembly. As a result, mold, rust, oxidation, moisture damage, stains and/or other problems may result. The condensate may also decrease the comfort level of the user. For example, under some conditions, moist or wet air may be blown on a user's legs, back and/or other portions of an occupant's body. Further, the condensate may create odor problems within the automobile, room or other location where the seat assembly 10 is located.

Figure 4A:
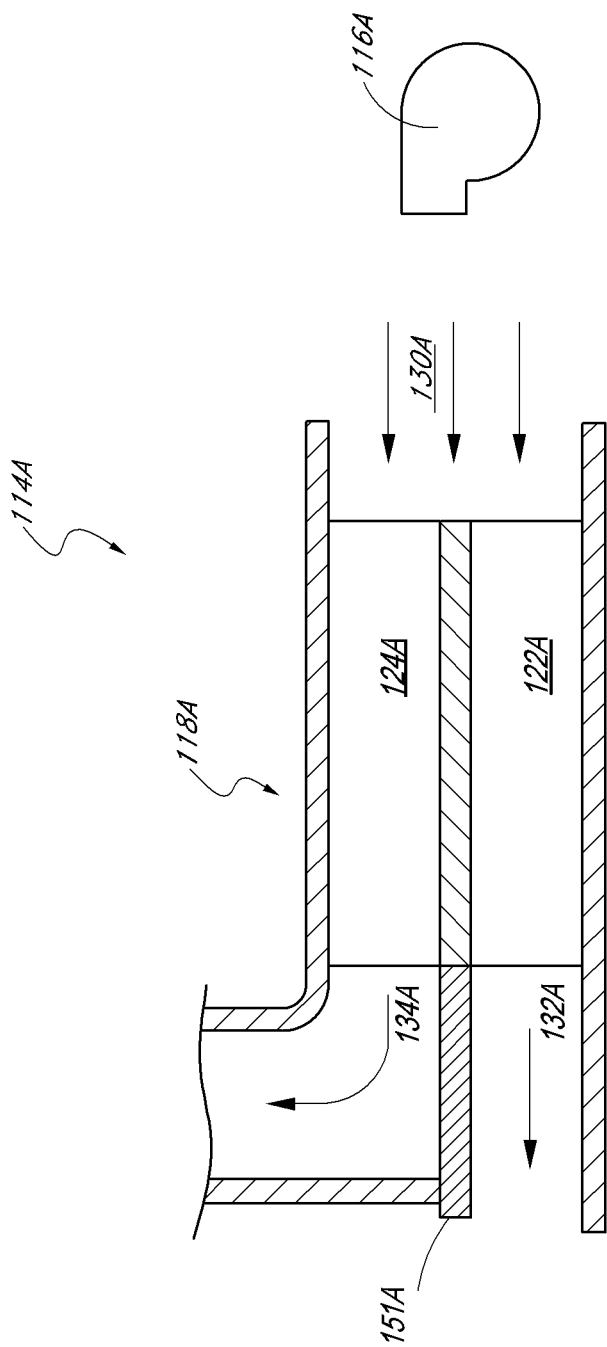
FIG. 4A illustrates a partial cross-sectional view of a fluid module comprising a wicking separator gasket according to one embodiment.
Figure 4B:
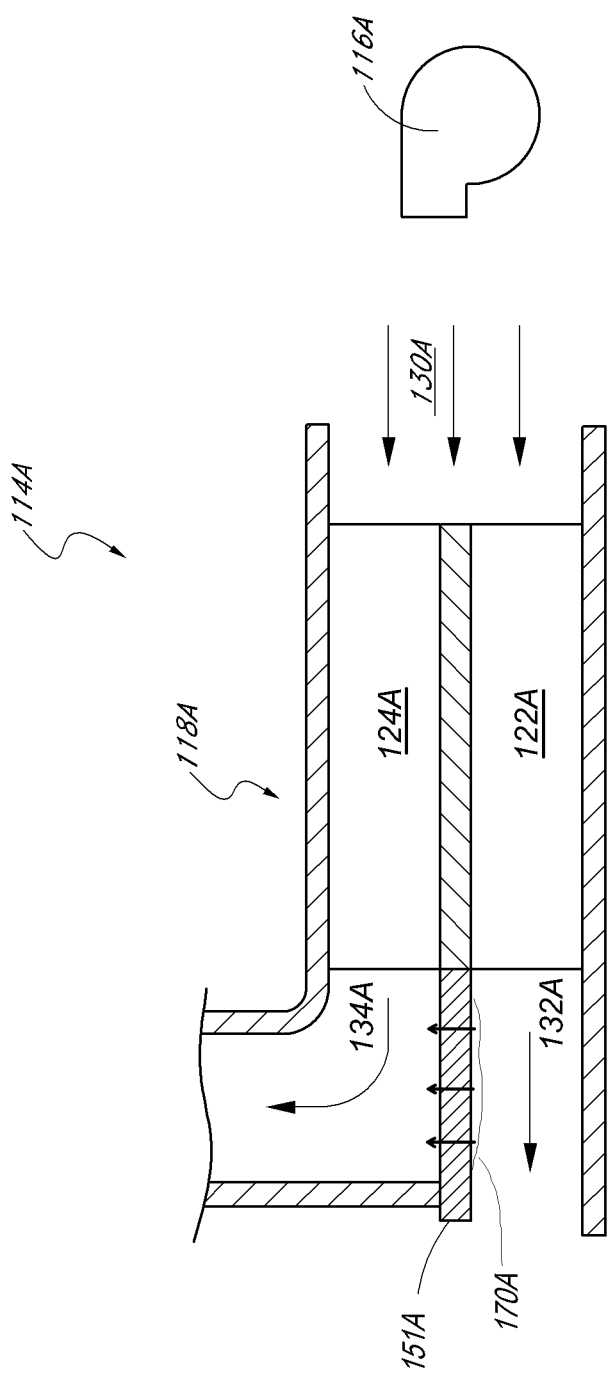
FIG. 4B illustrates a partial cross-sectional view of the fluid module of FIG. 4A when condensation is present.

FIGS. 4A and 4B illustrate one embodiment adapted to address the condensate formation and pooling problems discussed herein. In the depicted arrangement, the fluid module 114A comprises, inter alia, a fluid transfer device 116A and a TED 118A. As shown, the TED 118A can be located downstream of a fan or other fluid transfer device 116A. However, in any of the embodiments disclosed herein, a TED 118A can be alternatively located upstream of a fluid transfer device, as desired or required. The fluid transfer device 116A can be adapted to transfer air or other fluids to an inlet 130A of the TED 118A. In some arrangements, the TED 118A includes a hot side 124A and a cold side 122A. Thus, fluid flow can be selectively advanced through the inlet 130A and into the TED 118A, where the fluid can be divided between the hot side 124A and the cold side 122A. From the cold side 122A of the TED 118A, the fluid leaves via a cold side outlet 132A toward a waste duct. Likewise, from the hot side 124A of the TED 118A, the fluid leaves via a hot side outlet 134A that leads to the fluid distribution system 112.

According to some embodiments, as illustrated in FIG. 4A, a wicking separator gasket 151A is provided generally between the cold side outlet 132A and the hot side outlet 134A. The wicking separator gasket 151A can be configured so that it wicks water and/or other fluids that condense or otherwise form within a fluid module 114A away from the cold side 122A and to the hot side 124A. For example, FIG. 4B demonstrates one embodiment of condensed water 170A and/or other fluids generally passing from the cold side to the hot side through the wicking separator gasket 151A. In some embodiments, water or other liquid entering the hot side can be advantageously evaporated or otherwise removed from the fluid module 114A.

According to certain embodiments, the wicking material comprises one or more of the following characteristics that assist in transferring water and other condensation from the cold side to the hot side of the thermal module. The wicking material can have a low thermal conductivity so as to provide at least a partial thermal barrier between the cold side and the hot side when no condensation is present. Further, the wicking material may provide high capillary action. This capillary action may be in only one direction so as to ensure that the water and other condensation are properly transferred to the hot side of the module. In addition, the wicking material can comprise anti-fungal, anti-bacterial and/or other characteristics that help prevent the growth of potentially harmful or undesirable microorganisms thereon or therein.

In some embodiments, the wicking materials are configured to withstand relatively large variations in temperature (e.g., both short term and long term changes), relative humidity and/or the like. For example, the material can be adapted to withstand a temperature range of approximately 40 to 85 degrees Celsius. The wicking material can generally have a high resistance to air flow, while allowing moisture to wick therethrough. As a result, passage of cooled fluid from the cold side to the hot side of the thermal module can be reduced or minimized. Moreover, the wicking material can be configured so that it has little or no dimensional distortion during use. In addition, according to certain arrangements, the wicking material is configured to withstand the forces, moments, pH variations and/or other elements to which it may be subjected during its useful life. In some embodiments, the wicking separator gasket 151A and/or the finger wick members comprise polypropylene, nylon, other porous or non-porous materials and/or the like.

Condensation Sensors and Switches

In some embodiments, it may be desirable, preferred or necessary to detect the presence of condensation within or near the TED 118 or other portion of a thermal module. Thus, a robust yet cost effective sensor to detect the presence of condensation can be provided. Some illustrative embodiments of such condensate sensors are disclosed in U.S. Pat. No. 8,256,236, the entirety of which is hereby incorporated by reference. The condensate sensor can be utilized on or within any variety of climate conditioning systems and may be placed in any area where condensation is likely to pool or otherwise form.

In certain variants, the condensate sensor is configured to detect (e.g., measure, ascertain, quantify, etc.) various levels of condensate. For example, the condensate sensor can be configured such that an output from the sensor, such as voltage, varies as a function of the amount of condensate detected. In some embodiments, the condensate sensor detects the presence of water and/or other fluids by a change in electrical resistance. In some embodiments, the condensate sensor detects the presence of condensation by a change in electrical capacitance. Accordingly, in certain embodiments, the output from the condensate sensor can comprise an analog output.

In some implementations, the condensate sensor detects the presence of condensation in a digital manner. For example, the condensate sensor can toggle between a first state, such as a de-energized (e.g., "off") mode, and a second state, such as an energized (e.g., "on") mode. The condensate sensor can be in the first state, (e.g., de-energized) when the condensate sensor detects an amount of condensate that is less than a threshold level of condensate. When the condensate sensor detects an amount of condensate that is equal to or greater than the threshold level, the condensate sensor can change from the first state to the second state.

In certain implementations, once the presence of water and/or other fluids is detected by such sensors, the system can be configured to take one or more steps to eliminate the condensation or to otherwise remedy the problem. For example, according to some embodiments, once a sensor detects a threshold level of condensate within or near a TED 118, the system is designed to reduce the voltage supplied to the TED 118 until the condensation has been completely or partially removed or reduced. Such a reduction in voltage can reduce the extent to which fluids passing through the thermal module are cooled or heated, thereby reducing or stopping the formation of condensate.

In certain variants, the condensate sensor comprises a switch that is configured to toggle the power supplied to the TED 118. Such a switch can, for example, facilitate control of the TED 118 in a way that reduces cost and complexity. For example, in certain implementations, the TED 118 is controlled to be powered and depowered (e.g., to be selectively turned on and off) by a hardware condensate switch, thereby avoiding the need for a closed loop system, software and the associated hardware (e.g., processors) that add cost, complexity, and/or potential points of failure. In some embodiments, the condensate switch can facilitate control of the TED 118 without a feedback loop. For example, as will be discussed in further detail below, the condensate switch can be configured to energize and de-energize the TED 118 based on the presence, or lack thereof, of condensation above a threshold amount.

Figure 5A:
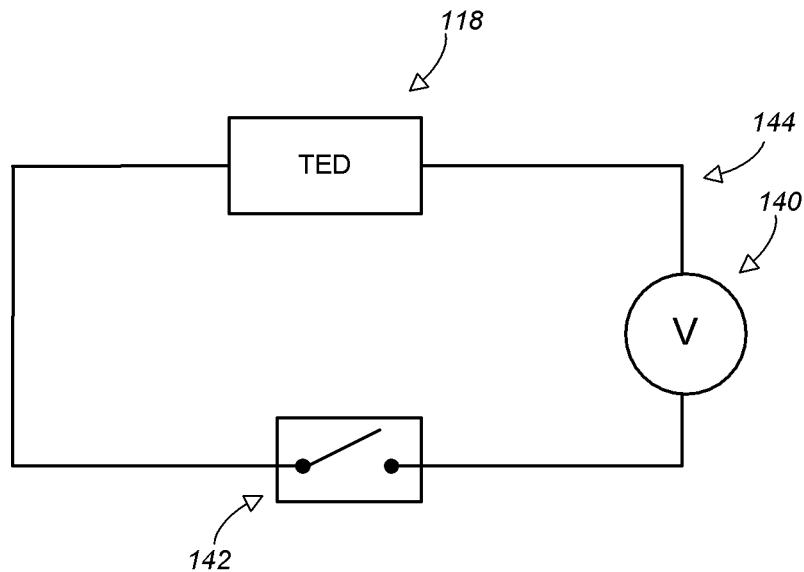
FIGS. 5A and 5B illustrate two states of an embodiment of an electrical circuit that can be used in connection with, for example, the embodiments of any of FIGS. 1-4B.
Figure 5B:
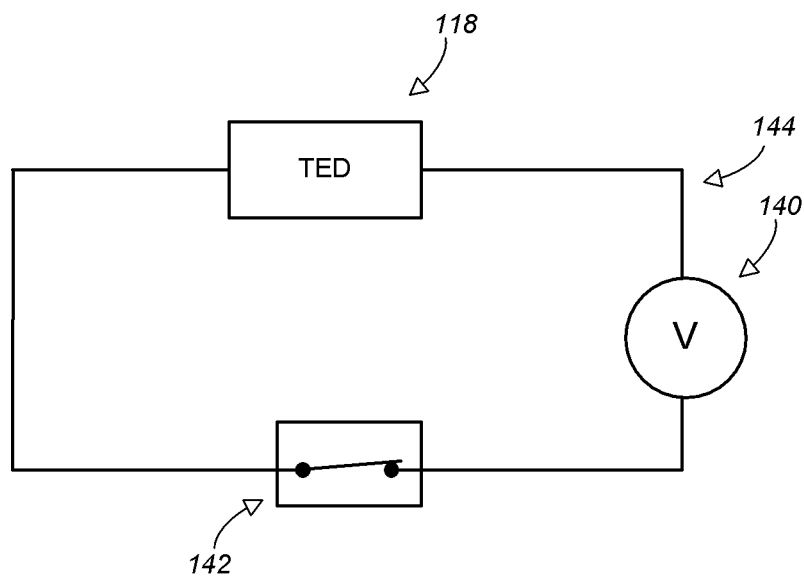

For example, with reference to the circuit diagrams of FIGS. 5A and 5B, a climate control system (which can be used in any of the embodiments discussed above, such as the seat assembly 10, or otherwise) can include an electrical circuit with a power source 140, the TED 118, and condensate switch 142. The power source 140, TED 118, and condensate switch 142 can be in electrical communication via connections 144, such as wires, traces, or otherwise. As discussed above, the condensate switch 142 can toggle between a first state and a second state. In certain implementations, when the condensate switch 142 is toggled to the first state, the circuit is closed, thereby allowing power to be supplied to the TED 118, as shown in FIG. 5A. For example, when the condensate switch 142 detects an amount of condensate that is less than a threshold level of condensate, the condensate switch 142 can be configured to allow power to be supplied to the TED 118.

On the other hand, in some embodiments, the circuit is interrupted when the condensate switch 142 is toggled to the second state, thereby reducing or eliminating power from being supplied to the TED 118, as shown in FIG. 5B. For example, when the condensate switch 142 detects an amount of amount of condensate that is equal to or greater than the threshold level, the condensate switch 142 can be configured to inhibit or prevent power from being supplied to the TED 118. In some embodiments, a reduction or elimination of power to the TED 118 results in a decrease in the temperature gradient between the cold side 122 and the hot side 124 and/or between the cold side 122 and ambient (e.g., the temperature of the air at the inlet 130). In certain implementations, a reduction or elimination of power to the TED 118 results in an increase of the temperature of the cold side 122 (e.g., above the dew point), which can reduce or eliminate the generation of condensation on the cold side 122.

In some embodiments, when the condensate switch 142 inhibits or prevents power from being supplied to the TED 118, some or all of the condensation on the cold side 122A can be evaporated or otherwise removed from the fluid module 114 (e.g., such as by the air passing over or through the cold side 122A). Thus, the amount of condensation can be reduced, which in turn can decrease the amount of condensation detected by the condensate sensor. In certain variants, the amount of condensate can eventually decrease to a level at which the amount of condensate detected by the condensate switch 142 is below the threshold level. In some such instances, the condensate switch 142 can toggle so as to allow power to be supplied to the TED 118 again.

FIGS. 5A and 5B are only illustrative and are not limiting. Therefore, various other configurations of the condensate switch 142 can be included in a variety of other electrical circuits. In some implementations, for example, an electrical circuit includes a configuration of the condensate switch 142 that includes leads positioned where condensation tends to collect, such as on, near or otherwise adjacent the waste side heat exchanger. In certain embodiments, the leads are spaced apart or otherwise configured to form an "open" portion of the circuit, thereby inhibiting the flow of electricity in the circuit. When sufficient condensation (e.g., a threshold amount) accumulates or is otherwise present on or near the leads, the circuit can "close," and thus facilitate the flow of electricity across the leads and through the circuit. When all or at least some of the condensation is removed (e.g., by evaporation), the circuit can "open" again, thereby re-inhibiting the flow of electricity in the circuit. In some embodiments, the circuit is configured such that electrical current is allowed to flow to the TED 118 when the circuit is "closed," and electrical current is inhibited or prevented from flowing to the TED 118 when the circuit is "open." Other embodiments of the circuit are configured such that electrical current is allowed to flow the TED 118 when the circuit is "open," and electrical current is inhibited or prevented from flowing to the TED 118 when the circuit is "closed."

In certain implementations, the condensate switch 142 is configured to facilitate service and/or maintenance. For example, the leads of the condensate switch 142 can be configured to facilitate periodic (e.g., monthly, annual, or otherwise) cleaning, replacement, or otherwise. In certain embodiments, the condensate switch 142 can be positioned and/or configured such that contaminants (e.g., dirt, dust, mineral buildup, or otherwise) on, near, or otherwise adjacent at least one of the leads can be removed. In certain implementations, cleaning of the condensate switch 142 can eliminate or reduce the chance of improper operation of the switch 142. For example, cleaning can reduce the likelihood of electrical current being allowed to flow between the leads because of the presence of contaminants, rather than because of the presence of condensation.

Figure 6:
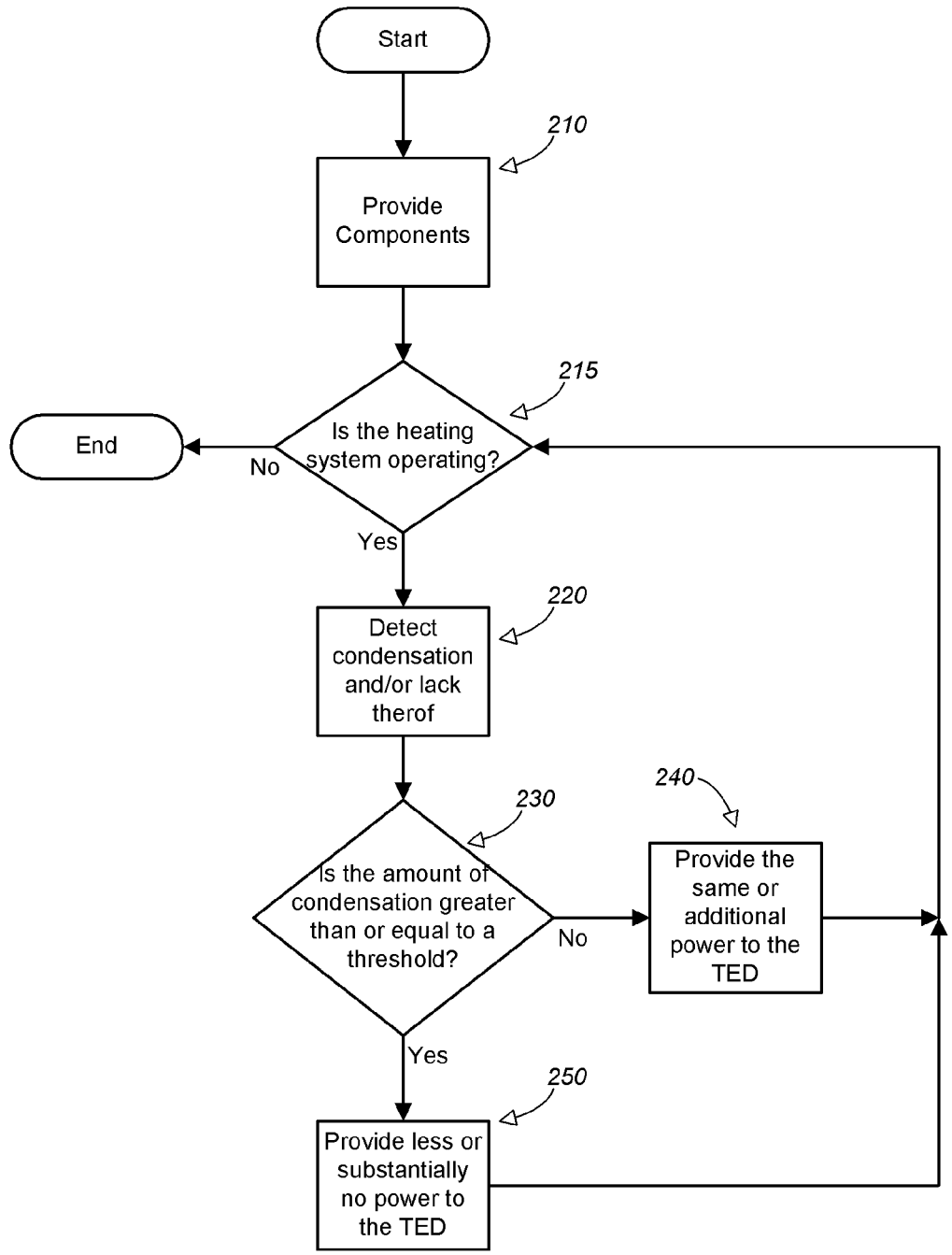
FIG. 6 illustrates an embodiment of a control scheme for abating moisture that can be used in connection with, for example, the embodiments of FIGS. 1-5.

With reference to FIG. 6, an embodiment of a control scheme for the TED 118 is illustrated. Some embodiments of the control scheme include block 210, which includes providing a TED 118, condensate switch 142, and source of electric current. In some embodiments, the condensate switch 142 is configured to permit or interrupt the provision of electrical current to the TED 118. In certain variants, the method includes a decision block 215 relating to whether the climate control system is in an active operating mode (e.g., a user has turned the system on). In some embodiments, if the system is on, then the method continues; if not then the method ends.

Some embodiments of the control scheme include detecting (e.g., measuring) condensation, such as with a condensation sensor or switch. In certain implementations, the condensation sensor is located at an area in or near the TED 118. In some implementations, the condensation sensor is located at an area remote from the TED 118, such as, for example, in the fluid distribution system and upstream or downstream of the TED 118, at the fluid distribution system inlet or outlet, in the environment surrounding the system (e.g., the vehicle interior that the automotive seat is located in, the room that the bed is located in, etc.) and/or anywhere else on or in proximity of the seating assembly.

With continued reference to FIG. 6, in some implementations, as illustrated by decision block 230, the method includes determining whether the amount of condensation detected is greater than or equal to a threshold amount. If the answer is negative, then the method moves to block 240 in which the condensate switch is toggled so as to allow electrical current to be supplied to the TED 118. Conversely, if the answer in block 230 is affirmative, then the method moves to block 250 in which the condensate switch 142 is toggled so as to reduce (e.g., by a set amount) or eliminate the electrical current provided to the TED 118.

In some embodiments, blocks or steps 240 and/or 250 can return to block 215, thereby allowing the repetition of some or all of blocks or steps 215-250. In certain variants, blocks or steps 240 and/or 250 can return to block or step 220, thereby allowing the repetition of some or all of blocks or steps 220-250. In some embodiments, blocks or steps 240 and/or 250 can return to block or step 230, thereby allowing the repetition of some or all of blocks or steps 230-250.

In some embodiments, in blocks of steps 240 and 250, the power supplied to the TED 118 (or other thermal conditioning device, member or component) is toggled substantially completely "on" or substantially completely "off." For example, in some embodiments, when the amount of condensation detected is less than the threshold amount, then at least about 15V (e.g., 15V, 16V, 17V, 18V, 19V, 20V, values between the foregoing, more than 20V, etc.) is supplied to the TED 118. Further, in some embodiments, when the amount of condensation detected is greater than or equal to the threshold amount, then about 0V (e.g., or a voltage close to 0V) is supplied to the TED 118. Some variants of the method do not adjust the electrical current or voltage supplied to the TED 118 or other thermal conditioning device based on the amount of condensation detected, aside from the aforementioned on/off adjustment.

In other embodiments, in blocks or steps 240 and 250, the power supplied to the TED 118 is modulated up or down (e.g., increased or decreased in a linear or nonlinear manner). For example, certain embodiments of the method include modulating the amount of electrical current or voltage supplied to the TED 118 as a step-function. In any of the embodiments disclosed herein, the manner in which adjustments are made to the voltage or current supplied to a TED (and/or other thermal conditioning device) is based, at least in part, on empirical or experimental data. In certain embodiments of the method, in blocks or steps 240 and 250, the electrical current or voltage supplied to the TED 118 is modulated as a linear, polynomic, or logarithmic function of the amount of the condensation detected.

Control Schemes Using Relative Humidity and/or Temperature Detection

A climate control seating assembly 10, such as a vehicle seat, a bed, a wheelchair, another medical bed or chair and/or the like, can be advantageously configured to automatically operate within a desired comfort zone. One embodiment of such a comfort zone (e.g., generally represented by a cross-hatched area 510) is schematically illustrated in the graph 500 of FIG. 7. As shown, a desired comfort zone 510 can be based, at least in part, on the temperature and relative humidity of a particular environment (e.g., ambient air, thermally conditioned air or other fluid being delivered through a climate controlled seat assembly 10, etc.). Thus, if the relative humidity is too low or too high for a particular temperature, or vice versa, the comfort level to an occupant situated within such an environment can be diminished or generally outside a target area.

Figure 7:
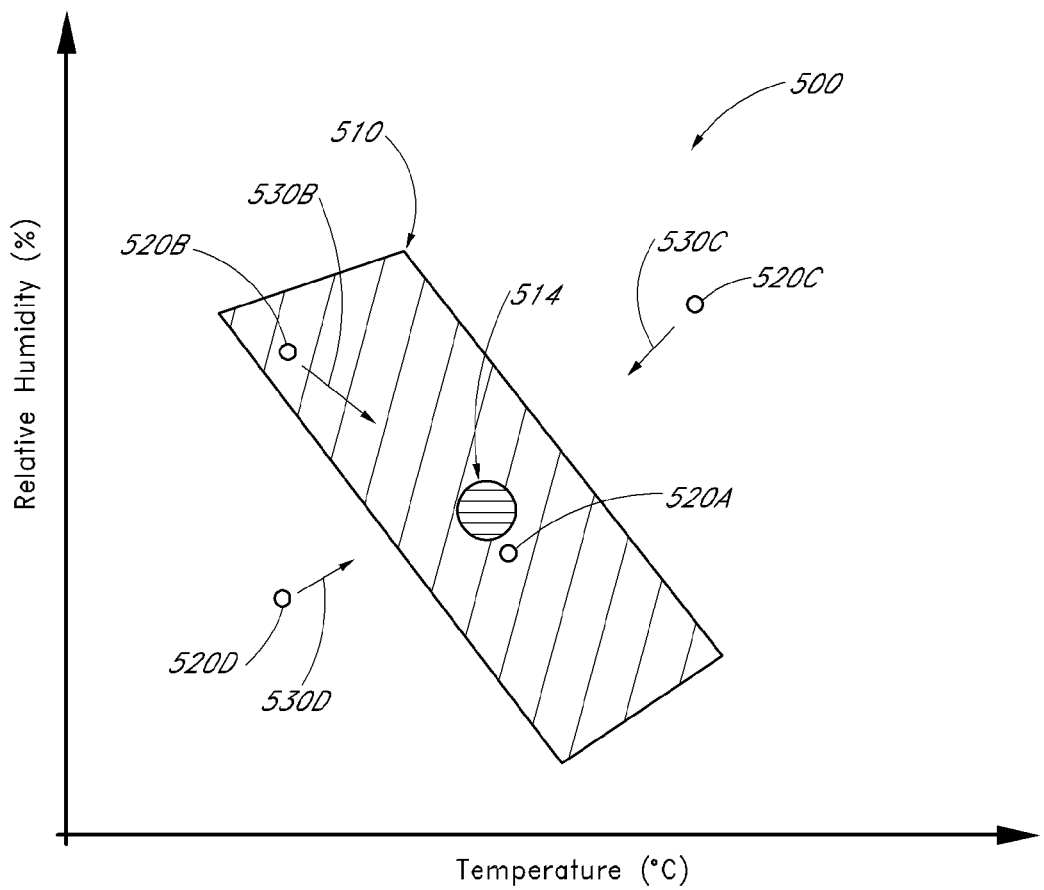
FIG. 7 illustrates one embodiment of a comfort zone in relation to temperature and relative humidity.

For example, with reference to a condition generally represented as point 520C on the graph 500 of FIG. 7, the relative humidity is too high for the specific temperature. Alternatively, it can be said that the temperature of point 520C is too high for the specific relative humidity. Regardless, in some embodiments, in order to improve the comfort level of an occupant who is present in that environment, a climate control system can be configured to change the surrounding conditions in an effort to achieve the target comfort zone 510 (e.g., in a direction generally represented by arrow 530C). Likewise, a climate control system for a seating assembly 10 situated in the environmental condition represented by point 520D can be configured to operate so as to change the surrounding conditions in an effort to achieve the target comfort zone 510 (e.g., in a direction generally represented by arrow 530D). In FIG. 7, environmental conditions generally represented by points 520A and 520B are already within a target comfort zone 510. Thus, in some embodiments, a climate control system can be configured to maintain such surrounding environmental conditions, at least while an occupant is positioned on the corresponding seating assembly (e.g., vehicle seat, bed, wheelchair, another medical bed or chair, etc.).

In some embodiments, a climate control system for a seating assembly 10 is configured to include additional comfort zones or target operating conditions. For example, as illustrated schematically in FIG. 7, a second comfort zone 514 can be included as a smaller area within a main comfort zone 510. The second comfort zone 514 can represent a combination of environmental conditions (e.g., temperature, relative humidity, etc.) that are even more preferable than other portions of the main comfort zone 510. Thus, in FIG. 7, although within the main comfort zone 510, the environmental condition represented by point 520B falls outside the second, more preferable, comfort zone 514. Thus, a climate control system for a seating assembly 10 situated in the environmental condition represented by point 520B can be configured to operate so as to change the surrounding conditions toward the second comfort zone 514 (e.g., in a direction generally represented by arrow 530B).

In some embodiments, a climate control system can include one, two or more target comfort zones, as desired or required. For example, a climate control system can include separate target zones for summer and winter operation. In some arrangements, therefore, the climate control system can be configured to detect the time of year and/or the desired comfort zone under which a climate controlled seat assembly is to be operated.

The incorporation of such automated control schemes within a climate control system can generally offer a more sophisticated method of operating a climate control seat assembly (e.g., bed). Further, as discussed herein, certain automated control schemes can help to simplify the operation of a climate controlled seat assembly and/or to lower costs (e.g., manufacturing costs, operating costs, etc.). This can be particularly important where it is required or highly desirable to maintain a threshold comfort level, such as for patients situated on wheelchairs, medical beds and/or the like. Further, automated control schemes can be especially useful for seating assemblies configured to receive occupants that have limited mobility and/or for seating assemblies where occupants are typically seated for extended time periods (e.g., beds, airplane seats, other vehicle seats, movie theaters, hospital beds, convalescent beds, wheelchairs, other medical beds or chairs, etc.).

According to some embodiments, data or other information obtained by one or more sensors is used to selectively control a climate control system in order to achieve an environmental condition which is located within a desired comfort zone 510, 514 (FIG. 7). For instance, a climate control system can include one or more temperature sensors and/or relative humidity sensors. Such sensors can be situated along various portions of a seating assembly (e.g., TED, thermal module, fluid distribution system, inlet or outlet of a fluid transfer device, fluid inlet, surface of an assembly against which an seated occupant is positioned, etc.) and/or any other location within the same ambient environment as the seating assembly (e.g., an interior location of an automobile, a bedroom, a hospital room, etc.). In some embodiments, one or more additional types of sensors are also provided, such as an occupant detection sensor (e.g. configured to automatically detect when an occupant is seated on a vehicle seat, a bed and/or any other seating assembly).

Regardless of the quantity, type, location and/or other details regarding the various sensors included within a particular assembly, the various components of the climate control system can be configured to operate (in one embodiment, preferably automatically) in accordance with a desired control algorithm. According to some embodiments, the control algorithm includes a level of complexity so that it automatically varies the amount of heating and/or cooling provided at the seating assembly based, at least in part, on the existing environmental conditions (e.g., temperature, relative humidity, etc.) and the target comfort zone.

Figure 8A:
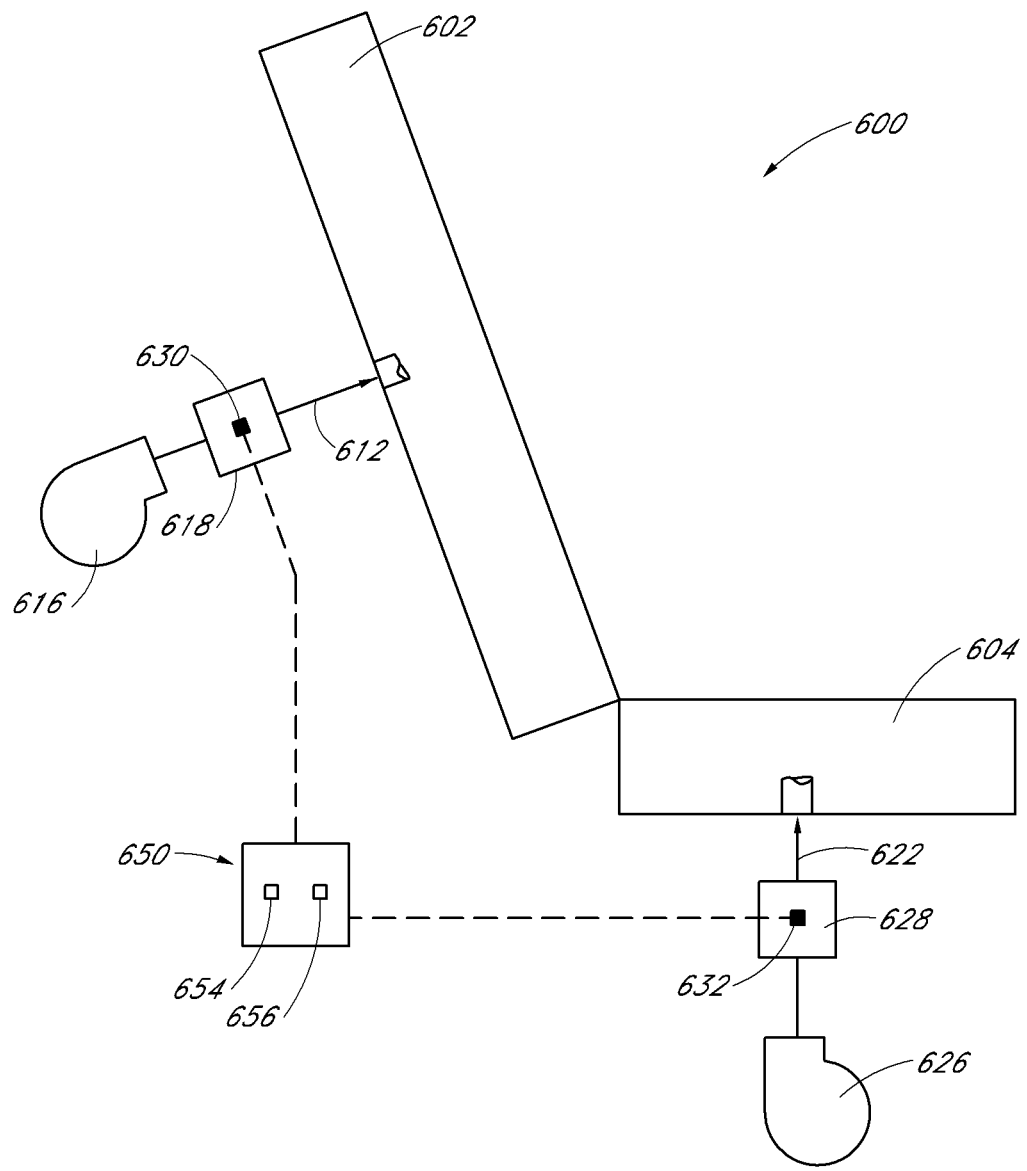
FIG. 8A illustrates one embodiment of a climate controlled seating assembly comprising a plurality of sensors according to one embodiment.

Accordingly, in some embodiments, a control system for a climate control seating assembly is configured to receive as inputs into its control algorithm data and other information regarding the temperature and relative humidity from one or more locations. For example, as illustrated in FIG. 8A, a climate controlled vehicle seat 600 can include fluid distribution systems 612, 622 along its seat back portion 602 and/or seat bottom portion 604. Each fluid distribution system 612, 622 can be in fluid communication with a fluid transfer device 616, 626 (e.g., fan, blower, etc.) and a thermoelectric device 618, 618 (e.g., a Peltier circuit, other device configured to selectively temperature condition air or other fluids passing therethrough, etc.). In the illustrated arrangement, a temperature sensor 630, 632 is located within or near each thermoelectric device 618, 628. Such sensors 630, 632 can be configured to detect the temperature of the TED, the temperature of a fin or other heat transfer member, the temperature of any other portion or components of the TED, the operating temperature of the TED, the temperature of the fluid within, entering or exiting the fins or other portion of the TED, the temperature upstream or downstream of the TED, the temperature upstream or downstream of the fluid transfer device, the temperature within the fluid distribution system 612, 622 and/or the temperature along any other portion of the thermal module or the seat assembly.

With continued reference to FIG. 8A, one or more sensors 654, 656 can be provided on a controller 650 and/or any other location surrounding the seat assembly 600, either in lieu of or in addition to the temperature sensors 630, 632 included on or near the TEDs. For instance, the depicted controller 650 can include a sensor 654 configured to detect the ambient temperature. Further, the controller 650 may also include a sensor 656 configured to detect the relative humidity of the surrounding environment (e.g., the interior or exterior of an automobile). Although not included in the depicted arrangement, one or more additional relative humidity sensors can be provided on or near the TEDs, within the fluid distribution systems of the seat assembly 600, any location where a temperature sensor is located (e.g., upstream or downstream of a fluid transfer device) and/or the like. Such relative humidity sensors can be configured to provide additional operational data that may further enhance the ability of a climate control system to automatically operate within a desired comfort zone 510, 514 (FIG. 7).

As illustrated in FIG. 8A, the controller 650 can be operatively connected to the various sensors 630, 632, 654, 656 located within or in the vicinity of a climate control seat assembly 600. Information received from the various sensors can be used to automatically regulate one or more devices or aspects of the climate control system, such as TEDs 618, 628 (e.g., the amount of voltage supplied thereto), the fluid transfer devices (e.g., the rate of which air is transferred through the fluid distribution systems 612, 622) and/or the like. In some embodiments, the controller 650 is also operatively connected to one or more external climate control systems (e.g., the automobile's or building's HVAC system). This can further enhance the ability of the climate control system to achieve a desired operating condition.

Figure 8B:
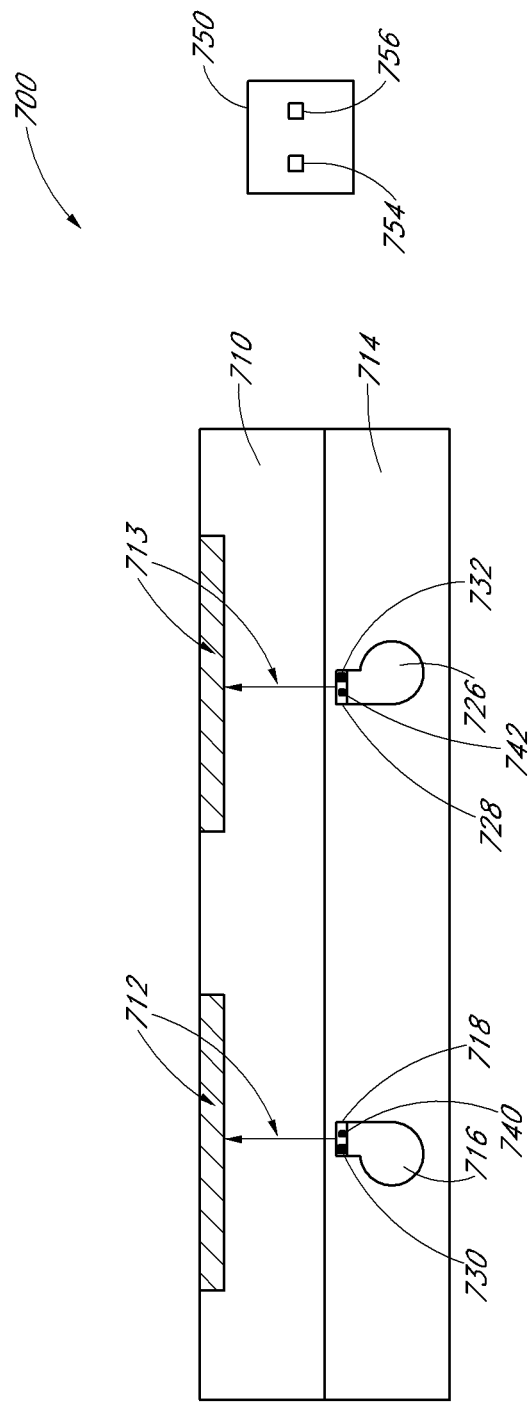
FIG. 8B illustrates one embodiment of a climate controlled bed comprising a plurality of sensors according to one embodiment.

In some embodiments, as illustrated in the bed assembly 700 of FIG. 8B, both a temperature sensor 730, 732 and a relative humidity sensor 740, 742 are provided within or near each TED 718, 728 (e.g., at or near a second side of a thermal conditioning device such as TED 718, 728) or fluid module in which such TED is positioned (e.g., the inlet of the fluid transfer device 716, 726). In some arrangements, additional temperature and/or relative humidity sensors 754, 756 are included within other portions of the bed assembly 700 (e.g., within the lower portion 714 and/or upper portion 712, within a fluid distribution member 712, 713, etc.), on a controller 750, on a wall of the room in which the bed assembly 700 is positioned and/or the like.

Regardless of the quantity, location, type and/or other details regarding the various sensors used in conjunction with a climate control system, such sensors can be advantageously configured to provide data and other information regarding the temperature and relative humidity of ambient air, the operational temperature of a particular climate controlled seating assembly (e.g., vehicle seat, bed, a medical bed, wheelchair, another medical chair, etc.) and/or the like to permit the seating assembly to be operated (e.g., automatically, if so desired) within a target comfort zone.

For example, as discussed herein with reference to FIG. 8A, the information transmitted from the various sensors to a controller can be used to automatically turn on or off and/or modulate various components of a climate controlled bed 700 or other seating assembly. In some arrangements, the fluid transfer devices and/or the TEDs are turned on or off, in accordance with a desired control scheme. As discussed, such beds and other seating assemblies can additionally include an occupant detection sensor that allows a control system to be notified when a user is seated or otherwise positioned thereon. Thus, a bed assembly 700 can be configured to automatically turn on or off and/or provide various levels of heated and/or cooled air when an occupant positions himself or herself thereon. This can advantageously eliminate the need for one or more manual controls (e.g., switches, controllers, etc.) that may otherwise be supplied with a climate controlled bed 700 or other seating assembly. Thus, such automated operational schemes can advantageously reduce both the cost and the complexity of providing and operating a climate controlled bed or other assembly.

In any of the embodiments disclosed herein, or equivalents thereof, the relative humidity sensors can be capacitance-based, resistance-based, thermal conductivity based and/or the like.

In simpler embodiments, a control algorithm is configured to receive only temperature data from one or more sensors. Alternatively, only relative humidity sensors can be used to provide information to a climate control system about the existing environmental conditions within or near a target seating assembly. In certain embodiments, additional information regarding the surrounding environment is provided to the control system, such as time of day, whether the ambient temperature is decreasing or increasing and/or the like. Accordingly, a target comfort zone 510 (e.g., FIG. 7) can be based on one, two, three or more variables, as desired or required.

Moisture Abatement in Heating Operation of Systems

In some conventional climate control systems, when the system is operating in a heating mode, moisture abatement (e.g., dehumidification of the air passing through the system) is not employed. This is the case generally because, during the heating mode, air is not cooled below the dew point temperature. Accordingly, condensation is typically not a concern. Furthermore, in certain instances, additional humidity in the air can provide latent heat that can be beneficial in providing a comfortable environment during the heating mode. However, unexpectedly, it has been determined that moisture abatement can be beneficial during a heating mode of operation of certain climate control systems having a TED. For example, moisture abatement during a heating mode of operation can be beneficial in certain variants of a climate controlled seat (CCS), a bed or climate controlled sleep system (CCSS), a climate controlled container (e.g., beverage container), any the embodiments described herein and/or the like.

As discussed herein in connection with FIG. 3, the TED 118 or other thermal conditioning device, member or component can include a main side 124 and a waste side 122. During a heating mode, when voltage is applied to the TED 118 or other thermal conditioning device (e.g., convective heater), the main side 124 generates heat and the waste side 122 absorbs heat. When operating certain climate control systems (such as the CCS or CCSS or other climate controlled systems) in heating mode, the waste side 122 of the TED 118 can achieve temperatures below that of the main side 124. In some embodiments, the waste side 122 can achieve temperatures at or below the dew point of the air passing over or through the TED 118, which can result in condensate forming on and/or along the waste side heat exchanger. The formation of the condensate can negatively restrict the airflow across the waste side heat exchanger. Such a restriction of airflow can decrease the rate and/or amount of heat transfer between the air and the waste side heat exchanger, which can cause a further reduction in the temperature of the waste side heat exchanger. If the temperature of the waste side of the TED falls below about 0° C., ice formation can begin to occur, further restricting or even preventing air flow across the waste side of the heat exchanger. Thus, it can be advantageous to monitor and/or account for the waste side heat exchanger temperature while operating the climate control system in heating mode. For example, a control scheme can account for the waste heat exchanger temperature when the climate control system is operating in heating mode by determining whether certain potentially problematic humidity conditions exist, as discussed in further detail below. In various embodiments, the control scheme can be executed by and/or reside in a processing unit (e.g., a local control unit, a central control unit, etc.).

Various implementations include sensors to provide temperature and/or humidity data to the processor for use in the control scheme. In some embodiments, one or more temperature sensors can be positioned to detect the waste side temperature and/or waste side heat exchanger temperature. In certain variants, a temperature sensor is positioned on the waste side of the TED or other thermal conditioning device to monitor waste air temperature. In some embodiments, one or more humidity sensors are positioned to detect the humidity of in the vicinity of the waste side heat exchanger and/or the general surroundings. For example, the humidity sensor can be positioned at: the blower (e.g., the air inlet location), a main or central control unit, MCU, (e.g., located on floor next to bed or floor of a vehicle), a support structure (e.g., a wire harness that is located inside the bed or seat), a user remote (e.g., located on night stand next to bed or at an armrest of a chair), and/or a wireless receiver (e.g., from a main HVAC unit). Certain implementations include one or more humidity sensors and no temperature sensors. Some variants do not include a sensor that measures the temperature.

In some embodiments, adjustments are made to the TED or other thermal conditioning device (e.g., convective heater) based on, at least in part, the relative humidity. Given the ambient temperature (e.g., about 10° C. to about 38° C.) in which certain embodiments typically operate, during heating mode, some embodiments are configured to make adjustments to the amount of power supplied to the TED or other thermal conditioning device based on relative humidity exclusively. For example, in certain implementations, during heating mode, the TED is adjusted when the relative humidity level reaches a threshold, such as greater than or equal to about 85%, 86%, 87%, 88%, 89%, 90%, 91%, 92%, 93%, 94%, 95%, 96%, 97%, 98%, values in between the foregoing, less than about 85%, more than about 98%, etc. In some embodiments, when the humidity exceeds or falls below a particular threshold or limit, the amount of power supplied to the TED or other thermal conditioning device can be adjusted (e.g., turned off, reduced, increased, or otherwise modified, etc.), as discussed in further detail herein. Such a configuration can, for example, reduce the likelihood of the waste side heat exchanger achieving a temperature that is about equal to or less than the dew point, and thus reduce the likelihood of condensation forming. Further, because some such variants do not use a temperature input (e.g., from a sensor measuring the waste side temperature) to determine whether or how to adjust the TED or other thermal conditioning device, the system's cost, complexity, and/or total number of components can be reduced.

Certain embodiments of the systems disclosed herein are configured to adjust a duty cycle of the TED or other thermal conditioning device based on whether the relative humidity threshold is met. "Duty cycle" is the percentage of the amount of time that the TED is in the powered mode to the total amount of time under consideration. For example, if the TED was powered for three seconds within a ten second time period, then the duty cycle would be expressed as 30%. Some embodiments, which can include one or both a heating mode and a cooling mode, can be configured to adjust the duty cycle of the TED based on some or all of features of Table 1.

TABLE 1

| Relative Humidity | Maximum TED Duty Cycle (Cooling Mode) | Maximum TED Duty Cycle (Heating Mode) |
| --- | --- | --- |
| 0%-62% | 100% | 100% |
| 62.1%-67% | 87% | 100% |
| 67.1%-72% | 75% | 100% |
| 72.1%-77% | 62% | 100% |
| 77.1%-82% | 50% | 100% |
| 82.1%-90% | 0% | 100% |
| 90.1%-100% | 0% | 50% |

As shown above in Table 1, according to some embodiments, at a relative humidity between 0% and 62%, if the system is in cooling mode, then the maximum duty cycle of the TED can be about 100%. Further, when the system is operating in heating mode, the maximum duty cycle of the TED can be about 100%. However, in some embodiments, if the relative humidity is between 62.1% and 67%, then the maximum duty cycle of the TED can decrease to 87% when the system is in cooling mode, and remain at 100% when the system is in heating mode. In certain variants, the TED can be depowered (e.g., about 0% duty cycle) when the system is in cooling mode and the relative humidity is greater than or equal to about 82.1%. In some implementations, during heating mode the maximum duty cycle of the TED can remain at 100% until the relative humidity is greater than or equal to about 90.1%, at which point the maximum duty cycle of the TED can decrease to 50%.

Certain embodiments are configured to adjust the duty cycle of the TED based on some or all of features of Table 2.

TABLE 2

| Relative Humidity | Maximum TED Duty Cycle (Cooling Mode) | Maximum TED Duty Cycle (Heating Mode) |
| --- | --- | --- |
| 0%-57% | 100% | 100% |
| 58%-67% | 75% | 100% |
| 68%-77% | 50% | 100% |
| 78%-85% | 25% | 100% |
| 86%-100% | 0% | 50% |

For example, when the relative humidity is between about 78% and about 85%, the maximum duty cycle can be about 25% in cooling mode and about 100% in heating mode. When the relative humidity is equal to or greater than about 86%, then the TED can be depowered (e.g., about 0% duty cycle) in cooling mode and have a maximum duty cycle of about 50% in heating mode. In some variants, if the system is in heating mode and the relative humidity is greater than or equal to a threshold value (e.g., about 86%), then the amount of power supplied to the TED is reduced (e.g., by about half).

In some implementations, the TED or other thermal conditioning device is adjusted based (e.g., exclusively or at least in part) on whether condensation is detected. For example, in some embodiments, the TED is allowed to operate up to a maximum duty cycle level (e.g., 100%) unless condensation above or below a limit is detected by a condensation sensor. If such a condition is met, then an adjustment can be made, such as energizing or de-energizing the TED or other thermal conditioning device, increasing the power supplied to the TED or other thermal conditioning device, or decreasing the power supplied to the TED or other thermal conditioning device. For example, according to some embodiments, the TED or other thermal conditioning device can operate at or near 100% duty cycle unless condensation is detected above a limit, in which case the TED is limited operating at no greater than 50% duty cycle. In some embodiments, the TED or other thermal conditioning device can operate at or near 100% duty cycle unless condensation is detected, in which case the TED or other thermal conditioning device is substantially de-energized (e.g., about 0% duty cycle).

Dew Point Calculation

As is evident from certain of the embodiments described herein, some embodiments are configured to abate moisture during heating mode without calculating a dew point. For example, as discussed above, some embodiments include a condensation sensor or switch and are configured to adjust the operation of the TED or other thermal conditioning device based on whether a threshold amount of condensation is detected; thus no additional dew point calculation is required. Such configurations can, for example, reduce cost, decrease the number of system components, reduce the overall physical size of the system, and/or lessen the amount of energy used by the system. Certain embodiments modulate (e.g., a voltage or current supplied to) the TED or other thermal conditioning device based on relative humidity, as discussed above in connection with Tables 1 and 2. Accordingly, some such embodiments are configured to abate moisture during a heating mode without calculating a dew point and/or receiving a temperature input.

However, in some embodiments, the dew point temperature can be calculated and used in a moisture abatement control scheme. For example, dry bulb temperature and relative humidity data can be collected (e.g., measured with sensors), and that data can be used to calculate the dew point. In certain variants, the dew point is determined with the following formula (in which td is the dew point temperature, t is the ambient dry bulb temperature, and RH is the relative humidity):

$$td \approx t - \frac{100 - RH}{5}$$

According to some implementations, the dew point is determined with the following formula (in which td is the dew point temperature (° C.), t is the ambient dry bulb temperature (° C.), RH is the relative humidity, the constant A is 17.625, and the constant B is 243.04° C.):

$$td = \frac{B\left[\ln\left(\frac{RH}{100}\right) + \frac{At}{B+t}\right]}{A - \ln\left(\frac{RH}{100}\right) - \frac{At}{B+t}}$$

In some embodiments, the dew point is not determined directly, but rather indirectly from one or more other inputs (e.g., detected or perceived measurements), factors and/or other information. For example, in certain embodiments, the temperature difference ("ΔT") between the waste side of the TED and the ambient temperature is known (e.g., by empirical measurements). In some such embodiments, the dew point conditions can be found with a table of ambient temperature and relative humidity, which can be stored in memory (e.g., in the MCU or processor). For example, for some embodiments with of a ΔT of about 8° C., the ambient temperature and relative humidity conditions at which the waste side will achieve the dew point are listed in Table 3.

TABLE 3

| Ambient (approx.) | Relative Humidity (approx.) |
| --- | --- |
| 30° C./86° F. | 62% |
| 28° C./82° F. | 62% |
| 26° C./79° F. | 62% |
| 24° C./75° F. | 60% |
| 22° C./72° F. | 59% |
| 20° C./68° F. | 59% |
| 18° C./64° F. | 58% |
| 16° C./61° F. | 58% |
| 14° C./57° F. | 57% |

As shown in Table 3, in certain embodiments, the waste side of the TED can achieve the dew point when the ambient temperature is about 24° C. and the relative humidity is about 60%. Similarly, in some implementations, the waste side of the TED can achieve the dew point when the ambient temperature is about 16° C.-18° C. and the relative humidity is about 58%.

In some embodiments, the system is configured to generally maintain the waste side heat exchanger at a temperature at or above the dew point temperature when the system is operating in a heating mode. For example, some embodiments determine the dew point (e.g., by measurement with a dew point sensor, by calculation, or with a table) and use that dew point in a control scheme for operation of one or more system components. In certain implementations, the dew point is used to control the amount of power supplied to the TED or other thermal conditioning device, such as by adjusting the duty cycle. For example, when the temperature of the waste side heat exchanger is determined to be at or within a range (e.g., less than or equal to about: 1° C., 2° C., 3° C., 4° C., values in between, or otherwise) of the dew point, then the control scheme can adjust the amount of power supplied to the TED or other thermal conditioning device. Such a configuration can, for example, decrease the likelihood of condensation occurring and/or can facilitate removal (e.g., by evaporation) of any condensation that has already occurred. In some implementations, the adjustment includes limiting the maximum duty cycle of the TED or other thermal conditioning device. In certain embodiments, the adjustment includes turning the TED or other thermal conditioning device off (e.g., supplying substantially no power to the TED or other thermal conditioning device).

Figure 9:
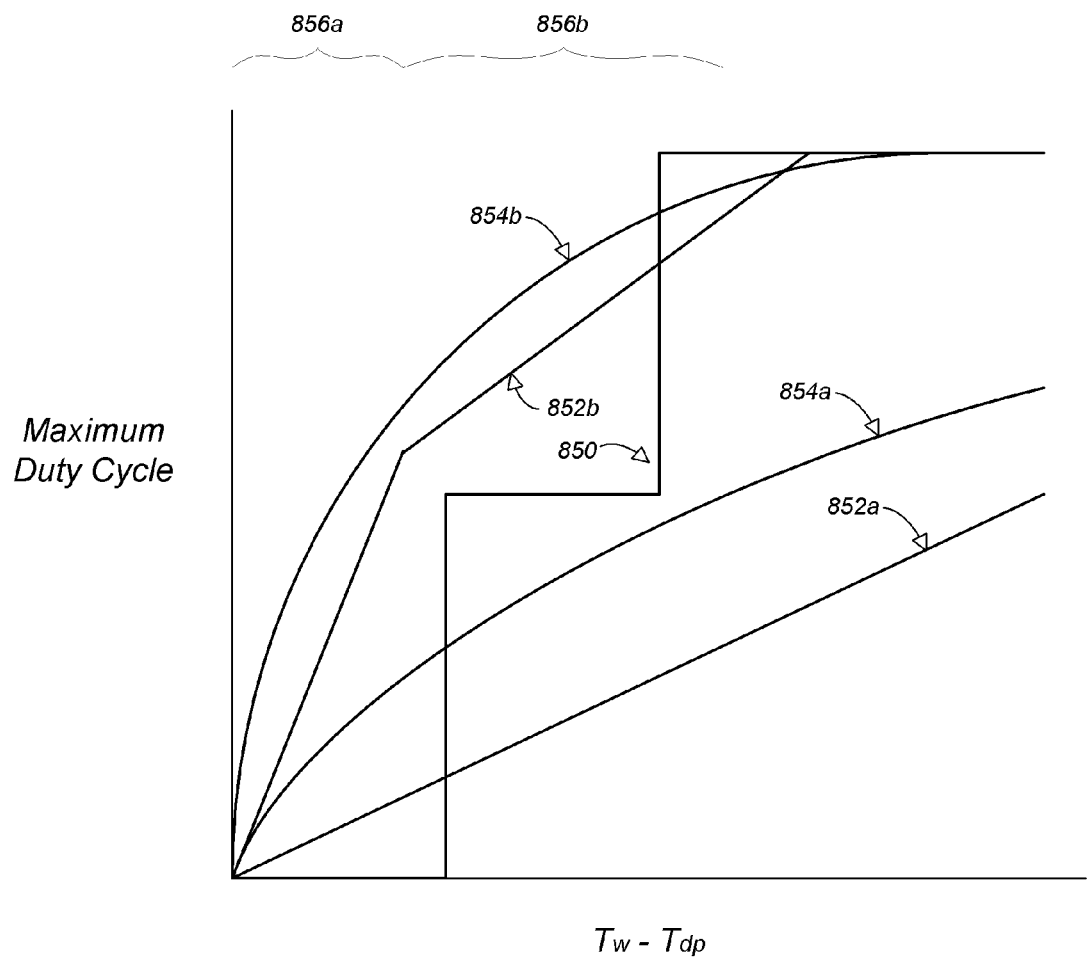
FIG. 9 illustrates a chart showing various control methodologies of a duty cycle of a thermoelectric device as a function of a temperature difference between a waste side heat exchanger and a dew point.

In some embodiments, during heating mode, the TED or other thermal conditioning device is modulated as a function of the difference between the waste side heat exchanger temperature ($T_w$) and the dew point ($T_{dp}$). For example, as shown in FIG. 9, based on the difference between the waste side heat exchanger temperature and the dew point, maximum duty cycle of the TED can be adjusted in a step relationship 850, linear relationship 852a, 852b, or nonlinear (e.g., exponential) relationship 854a, 854b. In certain embodiments, as the waste side heat exchanger temperature approaches the dew point temperature, the duty cycle of the TED is decreased. In some implementations, during heating mode the maximum duty cycle is configured to increase during a first portion 856a at a greater rate than during a second portion 856b. For example, the rate of change (e.g., the slope of the line) of some or all of the first portion 856a compared to the rate of change of some or all of the second portion 856b can be at least about: 2:1, 5:1, 10:1, 20:1, 50:1, values in between, or otherwise.

Condensation Control Via Power Supply to the TED or Other Thermal Conditioning Device Generally, during the heating mode, the waste side temperature is a function of the power supplied to the TED or other thermal conditioning device. As such, some embodiments are configured, during heating mode, to generally maintain the waste side heat exchanger temperature above a limit. For example, some embodiments are configured, during heating mode, to provide sufficient power to the TED to generally maintain the waste side temperature above the ambient temperature. Certain embodiments are configured, during heating mode, to provide sufficient power to the TED to generally maintain the waste side temperature above the dew point, thereby inhibiting or avoiding the formation of condensation on the waste side heat exchanger.

According to certain embodiments, the power supplied to the TED or other thermal conditioning device during heating mode is sufficient to generally maintain the waste side heat exchanger temperature above the dew point throughout the intended ambient temperature range (e.g., about 10° C. to about 38° C.) of operation of the system. Thus, the formation of condensation can be inhibited or avoided without the need to determine (e.g., measure or calculate) a dew point. In some embodiments, the waste side heat exchanger temperature is generally maintained above the dew point by providing at least about 80 W of power (e.g., about 11.4V and/or about 7 A) to the TED. In certain implementations, the waste side heat exchanger temperature is generally maintained above the dew point by providing at least about 135 W of power (e.g., about 15V and/or about 9 A) to the TED. In some embodiments, the waste side heat exchanger temperature is generally maintained above the dew point by providing at least about 162 W (e.g., about 18V and/or about 9 A) to the TED. In certain embodiments, the formation of condensation can be inhibited or avoided by providing between about 150 W and about 200 W (e.g., about 15V-20V and/or about 10 A) of power to the TED or other thermal conditioning device. In some implementations, about 3.5 amps (e.g., about: 3.0 A, 3.1 A, 3.2 A, 3.3.A, 3.4 A, 3.5 A., 3.6 A, 3.7 A, 3.8 A, 3.9 A, 4.0 A, values between the aforementioned values, or otherwise) about and/or about 8 volts (e.g., about: 7.0V, 7.1V, 7.2V, 7.3V, 7.4V, 7.5V, 7.6V, 7.7V, 7.8V, 7.9V, 8.0V, values between the aforementioned values, or otherwise) are provided to the TED when the climate control system is operating in heating mode. In certain embodiments, about 7 amps (e.g., about: 7.0 A, 7.1 A, 7.2 A, 7.3 A, 7.4 A, 7.5 A, 7.6 A, 7.7 A, 7.8 A, 7.9 A, 8.0 A, values between the aforementioned values, or otherwise) and/or at least about 8 volts are provided to at least one of the main side and waste side when the climate control system is operating in heating mode. In certain implementations, at least one of the main side and the waste side of the TED are provided with at least about 95 W (e.g., about 13.6V and/or about 7 A) when the climate control system is operating in heating mode. In various embodiments, the power supply is configure to provide between about 12V and about 18V (e.g., about: 12V, 13V, 14V, 15V, 16V, 17V, 18V, values between the aforementioned values, or otherwise) when the system is operating in heating mode In some embodiments, the climate control system includes a plurality of heating modes. For example, the system can have at least a low heating mode and a high heating mode. In some implementations, the amount of power provided to the TED is adjusted based on the type of heating mode. For example, a first amount of power (e.g., less than about 95 W) can be provided to at least one of the main side and the waste side of the TED when the system is in a low heating mode, and a second amount of power (e.g., greater than or equal to about 95 W) can be provided to at least one of the main side and the waste side of the TED when the system is in a high heating mode.

In some embodiments, the power supplied to the TED or other thermal conditioning device is sufficient to generally maintain the waste side heat exchanger temperature above the ambient temperature throughout the intended range of operation of the system (e.g., about 14° C. to about 30° C.). Such a configuration can eliminate (or reduce) the need to determine the dew point, thereby reducing the system complexity. For example, some embodiments are configured to provide sufficient power to the TED or other thermal conditioning device during a heating mode such that the waste side heat exchanger temperature is generally maintained above an ambient temperatures ranging from about 10° C. to about 38° C. In some such embodiments, the main side temperature can be between about 35° C. to about 60° C. According to certain variants, the waste side heat exchanger temperature can be generally maintained above the ambient temperature by providing at least about 135 W of power (e.g., about 15V and about 9 A) to the TED. In some embodiments, the waste side heat exchanger temperature can be generally maintained above the ambient temperature by providing at least about 162 W (e.g., about 18V and about 9 A) to the TED. In certain embodiments, the waste side heat exchanger temperature can be generally maintained above the ambient temperature by providing between about 150 W and about 200 W (e.g., about 15V-20V and about 10 A) of power to the TED.

In various embodiments, the system can be configured with the TED or other thermal conditioning device connected in series or in parallel. For example, some embodiments include a plurality of TEDs or other thermal conditioning devices, which are electrically connected in series during a cooling mode and in parallel during a heating operation. Certain such embodiments include two TEDs and have a power supply that is configured to provide between about 12V and about 18V. In some embodiments, the voltage at each of the TEDs during cooling can be about 7.5V and the voltage at each of the TEDs during heating can be about 15V. Due to certain inefficiencies and losses, in some such embodiments, the voltage at to each of the TEDs during cooling can be less than or equal to about 7V and the voltage at each of the TEDs during heating can be less than or equal to about 15V.

As noted above, in certain embodiments, the power supply can be configured to provide sufficient power to generally maintain a portion of the climate control system (e.g., the waste side of the TED, the waste side heat exchanger temperature, or otherwise) above the ambient temperature throughout the intended ambient temperature range of operation of the system (e.g., about 14° C. to about 30° C.). For example, it has been determined that, when used in certain climate control system implementations, a 12V power supply that provides about 5.5 A per side (main side and waste side) to each of two TEDs (e.g., electrically connected in parallel during heating mode) results in the fluid exiting the waste side heat exchanger having a temperature that is less than ambient temperature. However, when the system includes a 15V power supply that provides, for example, about 7.0 A per side (main side and waste side) to each of two TEDs (e.g., electrically connected in parallel during heating mode), then the fluid exiting the waste side heat exchanger has a temperature that is greater than the ambient temperature throughout the intended ambient temperature range of operation of the system. As such, the need for a dew point determination (e.g., calculation) can be lessened or eliminated the occurrence of condensation and/or to mitigate the presence of condensation that already occurred.

The various embodiments can use a variety of types of sensors. For example, some embodiments include a sensor that measures the dew point. Some embodiments include a sensor that measures the relative humidity (RH) only. Certain variants include a temperature sensor and/or use a temperature input in controlling the TED during heating mode. Other embodiments do not include a temperature sensor and/or do not use a temperature input in controlling the TED during heating mode. Certain embodiments include an integrated circuit humidity sensor, such as the HIH-4000 Series (commercially available from Honeywell International, Inc.). Some implementations include a humidity sensor from the HGT3500 Series (commercially available from Measurement Specialties, Inc.).

Some implementations can include multiple heated and/or cooled zones, with at least one sensor for each zone. For example, in some embodiments, the fluid distribution system includes ducts or other fluid-carrying structures that connects each of the zones to the TED, and has flow regulating elements (such as dampers or vanes) in each of the ducts, with each flow regulating elements being configured to allow more or less fluid to the respective zone based on the sensor's measurement of a characteristic (e.g., humidity and/or temperature) of the zone and the setpoint (e.g., setpoint humidity and/or temperature) of that zone. Certain implementations include a plurality of TEDs, such as one TED for each zone, with the TED being controlled based on the sensor's measurement of a characteristic (e.g., humidity and/or temperature) of the zone and the setpoint (e.g., setpoint humidity and/or temperature) of that zone.

For purposes of summarizing the invention and the advantages achieved over the prior art, certain objects and advantages of the invention are described herein. Of course, it is to be understood that not necessarily all such objects or advantages need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

Further, any of these control schemes can be used together with a condensation sensor and/or a wicking flow separator as discussed and illustrated in greater detail herein. For example, a control scheme operating within a target comfort zone can be overridden if a condensation sensor detects the presence of an undesirable level of fluid within the TED and/or other locations of the thermal module. Alternatively, the control scheme can be configured to continue operating toward a target comfort zone if a wicking material is provided within the thermal module to properly avoid condensation formation.

The systems, apparatuses, devices and/or other articles disclosed herein may be formed through any suitable means. The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

The following is claimed:

1. A climate control system configured to operate in a heating mode, the system comprising:
   a housing defining an interior space, the housing comprising an inlet and an outlet;
   a thermal conditioning device positioned in the interior space and having a main surface and a waste surface, the main surface configured to condition fluid passing through the interior space, wherein the waste surface is at a temperature less than a temperature of the main surface during the heating mode;
   a fluid transfer device comprising a plurality of blades, the fluid transfer device configured to selectively transfer fluid from the inlet to the outlet of the housing, wherein fluid passing through the interior space of the housing is heated by the main surface when the thermal conditioning device is activated;
   a humidity sensor configured to measure a humidity at the waste surface of the thermal conditioning device; and
   a processor configured to receive a humidity reading from the humidity sensor and to control electrical power supplied by a power source;
   wherein, when the system is operating in the heating mode and the humidity reading is equal to or greater than a humidity threshold, power supplied to the thermal conditioning device is reduced; and
   wherein, when the system is operating in the heating mode and the humidity reading is less than the humidity threshold, power supplied to the thermal conditioning device is increased or maintained.

2. The system of claim 1, wherein the thermal conditioning device comprises a thermoelectric device or another heating and cooling device.

3. The system of claim 1, wherein the thermal conditioning device comprises a convective heater or another heating device.

4. The system of claim 1, wherein the humidity reading is a relative humidity reading.

5. The system of claim 1, wherein the humidity threshold is between 85% and 95% relative humidity.

6. The system of claim 1, wherein the humidity threshold is 90% relative humidity.

7. The system of claim 1, wherein, when the system is operating in heating mode and the humidity reading is equal to or greater than the humidity threshold, the power supplied to the thermal conditioning device is reduced to a 50% duty cycle.

8. The system of claim 1, wherein, when the system is operating in heating mode and the humidity reading is less than the humidity threshold, the power supplied to the thermal conditioning device is increased to a 100% duty cycle or maintained at a 100% duty cycle.

9. The system of claim 1, further comprising a separator gasket positioned proximate to the outlet of the housing, the separator gasket configured to wick condensate from the waste surface of thermal conditioning device.

10. The system of claim 1, wherein the outlet of the housing is configured to direct the heated fluid to a climate controlled assembly or compartment.

11. A method of controlling a climate control system, the method comprising:
   providing a climate control system configured to operate in a heating mode, the climate control system comprising:
      a thermal conditioning device positioned in an interior space of a housing and having a main surface and a waste surface, the main surface configured to condition fluid passing through the interior space, the waste surface being configured to achieve a temperature less than a temperature of the main surface during the heating mode;
      a fluid transfer device configured to selectively transfer fluid across, through a portion of the thermal conditioning device, wherein fluid passing through the interior space of the housing is heated by the main surface when the thermal conditioning device is activated;
   operating the climate control system in the heating mode;
   detecting a relative humidity at the waste surface of the thermal conditioning device;
   comparing the relative humidity to a threshold humidity value; and
   reducing an amount of power supplied to the thermal conditioning device when the relative humidity is equal to or greater than the threshold humidity value; and
   increasing or maintaining the amount of power supplied to the thermal conditioning device when the relative humidity is less than the threshold humidity value.

12. The method of claim 11, wherein measuring the relative humidity comprises measuring the relative humidity with a humidity sensor.

13. The method of claim 11, wherein reducing the amount of power supplied to the thermal conditioning device is accomplished by decreasing a duty cycle of the thermal conditioning device.

14. The method of claim 11, wherein increasing or maintaining the amount of power supplied to the thermal conditioning device is accomplished by increasing or maintaining a duty cycle of the thermal conditioning device.

15. The method of claim 11, wherein reducing the amount of power supplied to the thermal conditioning device comprises decreasing the amount of power by 50%.

16. The method of claim 11, wherein reducing the amount of power supplied to the thermal conditioning device comprises substantially eliminating power to the thermal conditioning device.

17. The method of claim 11, wherein the method does not include measuring a temperature.

18. The method of claim 11, wherein the method does not include determining a dew point.

19. The method of claim 11, wherein the waste surface is in thermal communication with a waste side heat exchanger of the thermal conditioning device.

20. The method of claim 11, wherein the thermal conditioning device comprises a thermoelectric device.

21. The method of claim 11, further comprising directing fluid heated by the main side of the thermal conditioning device to a climate controlled assembly or compartment.

22. A climate control system configured to operate in a heating mode, the system comprising:
- a housing defining an interior space, the housing having an inlet and an outlet;
- a thermal conditioning device positioned in the interior space and having a main side and a waste side, the main side configured to condition fluid passing through the interior space, wherein the waste side is at a temperature less than a temperature of the main side during the heating mode;
- a fluid transfer device configured to selectively transfer fluid from the inlet to the outlet of the housing, wherein fluid passing through the interior space of the housing is heated by the main side when the thermal conditioning device is activated; and
- a condensate switch configured to toggle between a first state and a second state, the first state being when condensation is detected at a level greater than or equal to a threshold and the second state being when condensation is not detected at a level greater than or equal to the threshold, wherein the condensate switch is located on the waste side;
- wherein, when the condensate switch is in the first state and the system is operating in the heating mode, the condensate switch is configured to interrupt power supplied to the thermal conditioning device.

23. The system of claim 22, wherein, when the condensate switch interrupts power supplied to the thermal conditioning device, an amount of power is supplied to the thermal conditioning device that is less than the power supplied to the thermal conditioning device when the condensate switch is in the second state.

24. The system of claim 22, wherein, when the condensate switch interrupts power supplied to the thermal conditioning device, the power supplied to the thermal conditioning device is eliminated.

25. The system of claim 22, wherein, when the condensate switch toggles from the first state to the second state, supply of power to the thermal conditioning device resumes.

* * * * *